Oct. 31, 1950 H. S. BEATTIE ET AL 2,528,411

RECORD SENSING DEVICE

Filed Aug. 14, 1947 21 Sheets-Sheet 1

INVENTORS
HORACE S. BEATTIE
RALPH E. PAGE
BY J W Armbruster
ATTORNEY

Oct. 31, 1950 H. S. BEATTIE ET AL 2,528,411

RECORD SENSING DEVICE

Filed Aug. 14, 1947 21 Sheets-Sheet 2

INVENTORS
HORACE S. BEATTIE
BY RALPH E. PAGE
J W Armbruster
ATTORNEY

RECORD SENSING DEVICE

Filed Aug. 14, 1947 21 Sheets-Sheet 3

INVENTORS
HORACE S. BEATTIE
RALPH E. PAGE
BY J W Armbruster
ATTORNEY

Oct. 31, 1950 H. S. BEATTIE ET AL 2,528,411

RECORD SENSING DEVICE

Filed Aug. 14, 1947 21 Sheets-Sheet 4

INVENTORS
HORACE S. BEATTIE
BY RALPH E. PAGE
J W Armbruster
ATTORNEY

Oct. 31, 1950 H. S. BEATTIE ET AL 2,528,411

RECORD SENSING DEVICE

Filed Aug. 14, 1947 21 Sheets-Sheet 5

INVENTORS
HORACE S. BEATTIE
RALPH E. PAGE
BY
J W Armbruster
ATTORNEY

Oct. 31, 1950 H. S. BEATTIE ET AL 2,528,411

RECORD SENSING DEVICE

Filed Aug. 14, 1947 21 Sheets-Sheet 6

INVENTORS
HORACE S. BEATTIE
BY RALPH E. PAGE
J W Armbruster
ATTORNEY

Oct. 31, 1950 H. S. BEATTIE ET AL 2,528,411

RECORD SENSING DEVICE

Filed Aug. 14, 1947 21 Sheets-Sheet 7

INVENTORS
HORACE S. BEATTIE
BY RALPH E. PAGE

J W [signature]
ATTORNEY

Oct. 31, 1950 H. S. BEATTIE ET AL 2,528,411

RECORD SENSING DEVICE

Filed Aug. 14, 1947 21 Sheets-Sheet 8

INVENTORS
HORACE S. BEATTIE
BY RALPH E. PAGE
J W [signature]
ATTORNEY

INVENTORS
HORACE S. BEATTIE
BY RALPH E. PAGE
J W Armbruster
ATTORNEY

INVENTORS
HORACE S. BEATTIE
BY RALPH E. PAGE
J. W. Armbruster
ATTORNEY

Oct. 31, 1950 H. S. BEATTIE ET AL 2,528,411

RECORD SENSING DEVICE

Filed Aug. 14, 1947 21 Sheets-Sheet 11

INVENTORS
HORACE S. BEATTIE
BY RALPH E. PAGE
J W Armbruster
ATTORNEY

Oct. 31, 1950 H. S. BEATTIE ET AL 2,528,411

RECORD SENSING DEVICE

Filed Aug. 14, 1947 21 Sheets-Sheet 12

INVENTORS
HORACE S. BEATTIE
BY RALPH E. PAGE

J W Armbruster
ATTORNEY

Oct. 31, 1950 H. S. BEATTIE ET AL 2,528,411

RECORD SENSING DEVICE

Filed Aug. 14, 1947 21 Sheets-Sheet 13

INVENTORS
HORACE S. BEATTIE
RALPH E. PAGE
BY J W Armbruster
ATTORNEY

INVENTORS
HORACE S. BEATTIE
BY RALPH E. PAGE
J W Armbruster
ATTORNEY

INVENTORS
HORACE S. BEATTIE
RALPH E. PAGE
BY J W Armbruster
ATTORNEY

INVENTORS
HORACE S. BEATTIE
BY RALPH E. PAGE
J W Armbruster
ATTORNEY

INVENTORS
HORACE S. BEATTIE
RALPH E. PAGE
BY J W Armbruster
ATTORNEY

Oct. 31, 1950 H. S. BEATTIE ET AL 2,528,411

RECORD SENSING DEVICE

Filed Aug. 14, 1947 21 Sheets-Sheet 18

INVENTORS
HORACE S. BEATTIE
RALPH E. PAGE
BY
J W Armbruster
ATTORNEY

INVENTORS
HORACE S. BEATTIE
RALPH E. PAGE
BY J W Armbruster
ATTORNEY

INVENTORS
HORACE S. BEATTIE
BY RALPH E. PAGE
J W Armbruster
ATTORNEY

Oct. 31, 1950 H. S. BEATTIE ET AL 2,528,411

RECORD SENSING DEVICE

Filed Aug. 14, 1947 21 Sheets-Sheet 21

INVENTORS
HORACE S. BEATTIE
RALPH E. PAGE
BY J W Armbruster
ATTORNEY

Patented Oct. 31, 1950

2,528,411

UNITED STATES PATENT OFFICE 2,528,411

RECORD SENSING DEVICE

Horace S. Beattie and Ralph E. Page, Poughkeepsie, N. Y., assignors to International Business Machines Corporation, New York, N. Y., a corporation of New York Application August 14, 1947, Serial No. 768,639

31 Claims. (Cl. 235—61.6)

The invention relates generally to improvements in record card feeding and sensing devices and more particularly to improved means for sensing a control element with a plurality of decks of data indicia in code.

An object of the invention is to provide static card sensing devices of an electromechanical nature, wherein the electrical contact is not established directly through the perforations of the record but instead is established by cooperation with sturdy mechanical sensing devices, which in turn cooperate with the perforations in the record. The records are advanced successively from a magazine and brought to rest successively in a plurality of sensing stations, wherein a complete series of sensing pins are provided, one for each index point position. All the pins at a sensing station are mounted in a vertically reciprocating frame which is depressed at the proper time to project certain of the pins through the code perforations in the card. Cooperating with the upper portions of the pins are a number of levers or bell cranks, there being a set of three for each column of pins and one lever for each deck of seven pins in the column, said levers being mounted in a horizontally reciprocating frame which is vibrated after the depression of the pin holding frame to draw the levers over the tops of the pins. As the levers are cammed by the pin heads, which do not project through perforations, and descend over pin heads of pins in perforations, they rock to establish electrical contact and send differentially timed impulses from the sensing unit to accounting control devices, such as adding, printing, or sorting controls or any of the usual accounting machine functional devices. The digit perforations are in a compact four hole code to represent the ten digits, the code index points being designated 5, 3, 1 and 0 in the order of sensing. Three other code positions Z, Y and X are used for special sign and alphabet character selection.

Another object of the invention is the provision of electro-mechanical sensing devices cooperating with two successive cards in a progression of sensing stations. The two sensing stations correspond with what is known in the art as upper and lower sensing brush stations. The primary reason for the arrangement of two such stations is for comparing purposes to determine during a run of cards when the group number perforations thereon differ, denoting the end of the run of one group of cards and the beginning of the run of another group of cards. The first sensing station encountered is known as the control station, and the second sensing station is commonly referred to as the recording and adding control station. In the present case, the sensing devices of the first station differ from those of the second station in that an extra set of pin actuated levers is provided in the second station to control adding, the timing of which extends over a longer period than the group control function, which is a matter of merely sensing coincidence between two sets of code perforations. The adding function involves a factor of timing, wherein a small number of code perforations, for example, three code perforations representing 5, 3, and 0 holes, respectively (the 0 hole in the present code system representing a 1 in conjunction with either the 3 or the 1 hole), being summed up to represent the numeral 9.

In order to extend the adding cycle when using the present compact code, the cycle of sensing for digits of the value 5 and over is spread out, such digits being sensed by a plurality of adding start impulses under control of successive pin sensing levers or bell cranks. For example, in the sensing of a 9, as the two levers cam over a column of pins, the first lever is ineffective at the 5 position but is effective in the 3 and 0 positions to send one impulse to start adding three and a second impulse to check a blocking impulse to add another unit; this is followed by the second lever which is effective later in the same 5 position to again start adding control which is only interrupted after five is added. Thus, by the use of a second lever and a late "5" impulse, a plurality of adding start impulses are spread out over a wide operating interval. By means of such control, it is possible to effect addition control in a single operating cycle of the normal kind, wherein addition is of the start, stop and time controlled variety and the higher value digits are represented by greater lengths of time of operation of adding control devices, and to do so without complicated translation and in direct cooperation with a small number of perforations arranged in a code formation. Heretofore, arrangements of code perforations and cooperating static sensing devices did not have the advantages mentioned of directly varying the time of operation in accordance with code values.

Another object of the invention is to provide improved card feeding devices wherein a record card after being issued out of a magazine is engaged by pairs of skid feeding rollers, certain of said rollers being adjustably arranged at an angle to the normal path of movement. The angle of the biased feed rollers is such as to bring one side edge of each card over to a fixed predetermined position, wherein a guide rail serves to align the record and bring it accurately into a sensing station and positioned therein with the index points thereon in register with the sensing pins. These angular feeding rollers are separately adjustable to vary the degree of offset feeding.

A further object of the invention is the provision of improved card feeding devices involving the operation of cooperating skid or friction rollers tending to advance the records impositively in a feeding path and the restriction of such movement to hold the records at sensing stations by means of stops or gates projected in the card path, said gates being operated electromechanically by cams associated with the clutch devices released under magnetic control.

A still further object of the invention is the provision of card sensing devices constructed on a unitary basis wherein the several portions of the device are removable and assembled separately for purposes of repair and inspection.

An object of the invention is the provision of improved sensing devices cooperating with a record card of the form having three decks of code perforations, each deck comprising sixty columns of such perforations with seven index points in each column. The code representations vary from the use of one perforation to five out of the seven possible positions, and thereby represent the digits and alphabetic characters as well as a number of special signs.

Other objects of the invention will be pointed out in the following description and claims and illustrated in the accompanying drawings, which disclose, by way of example, the principle of the invention and the best mode, which has been contemplated, of applying that principle.

Figure 6:
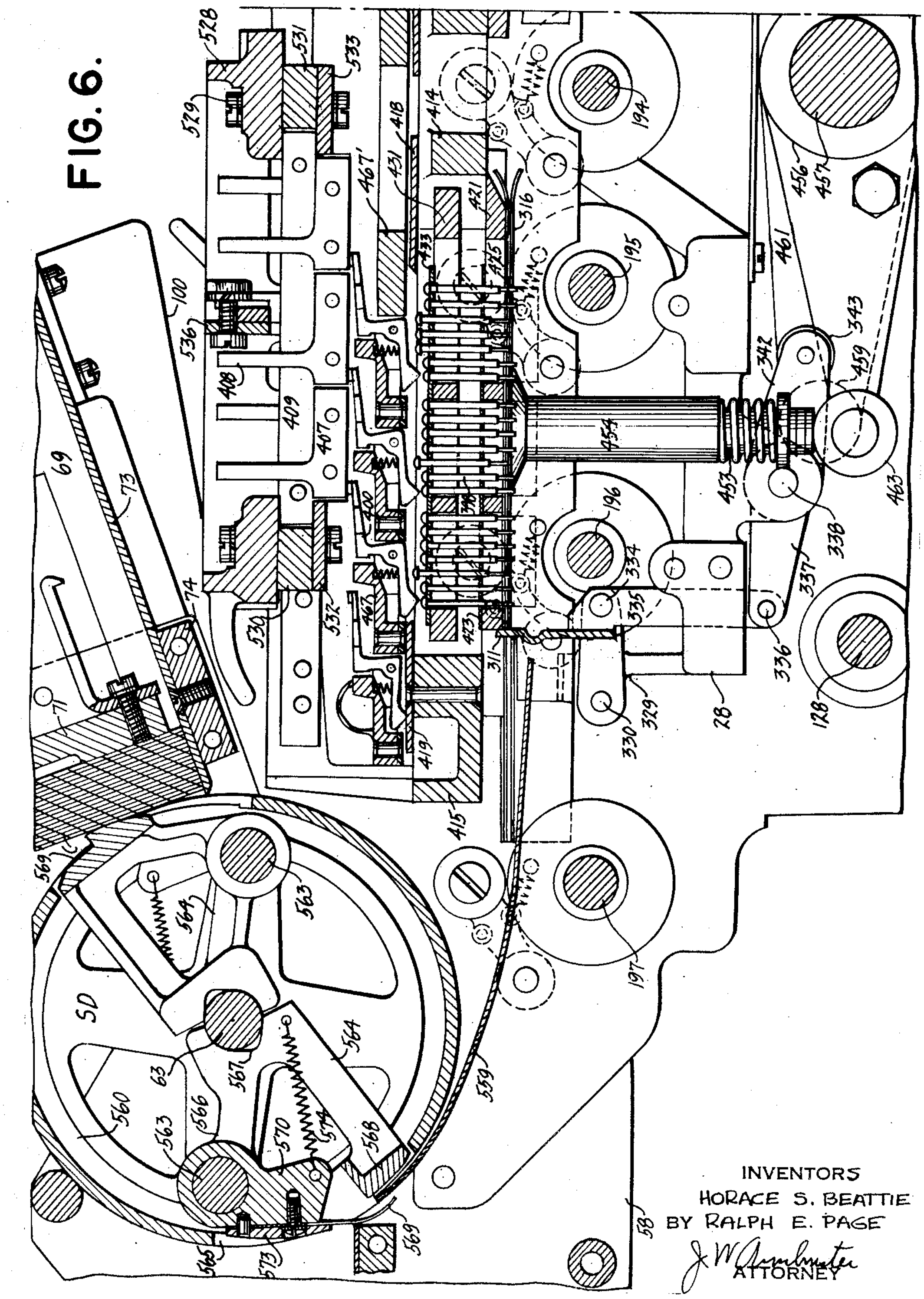
Figure 6A:
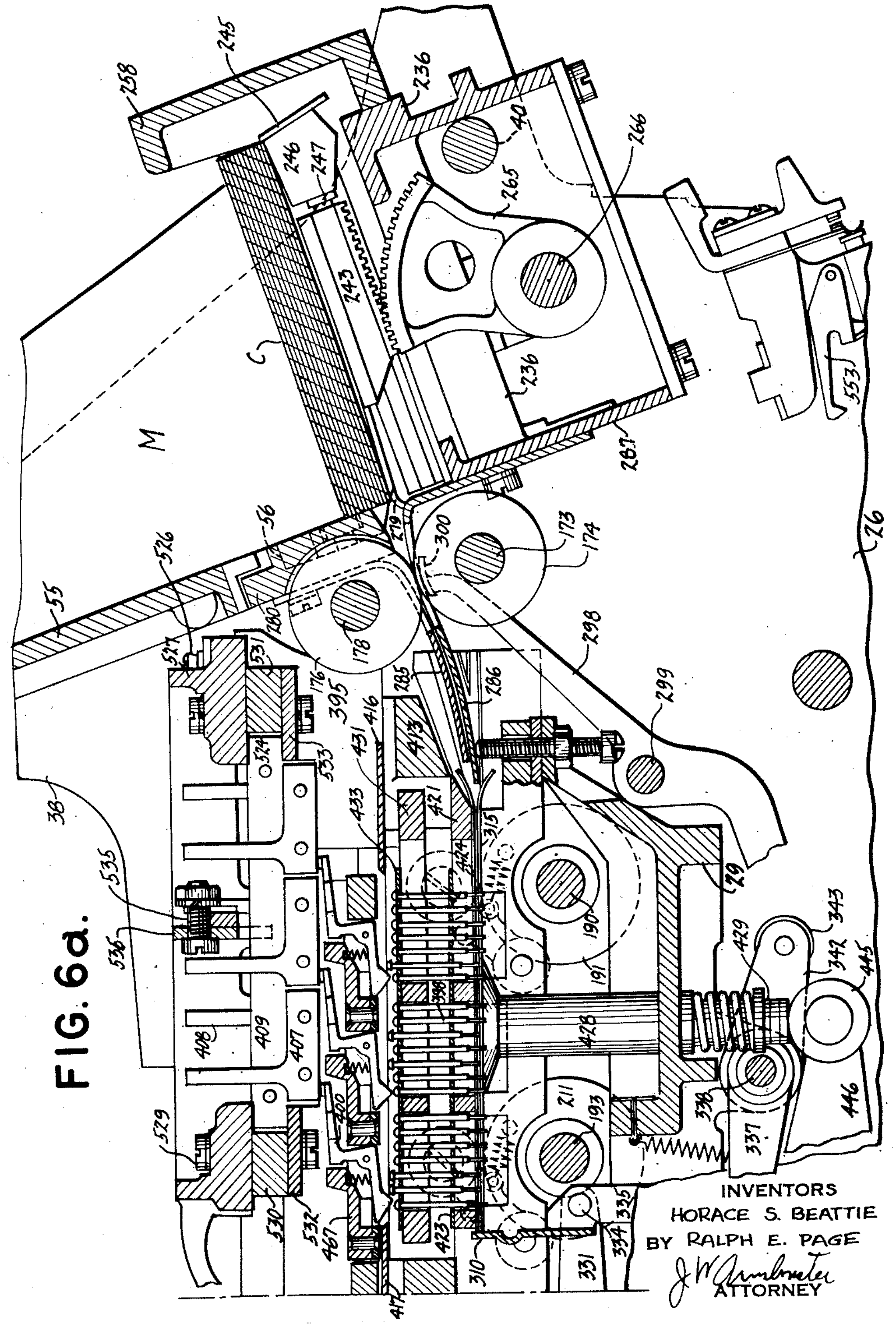

Figs. 6 and 6*a* when taken together are a sectional elevation of the two sensing stations and the magazine.

Figure 6B:
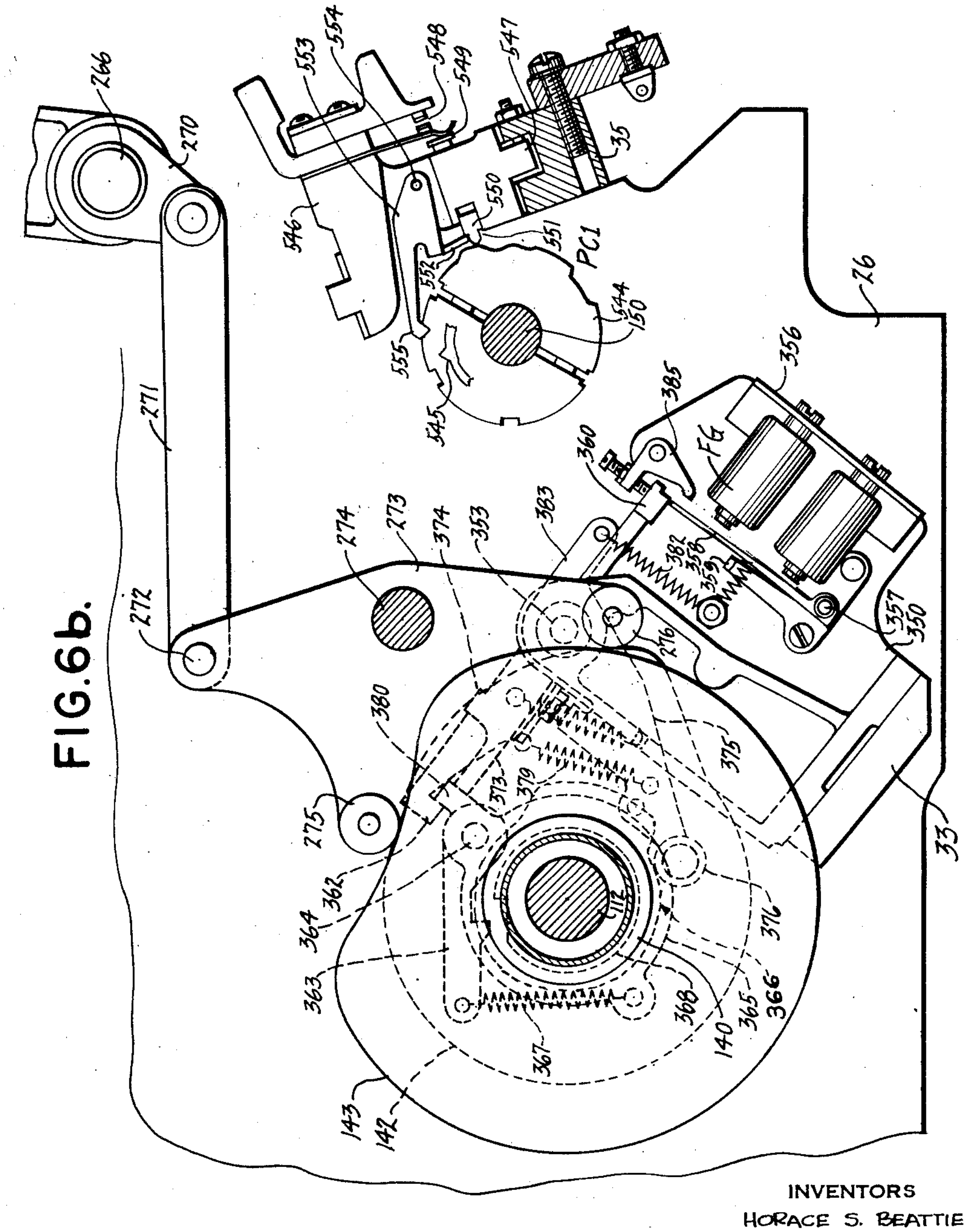

Fig. 6*b* is an elevation view showing the front gate operating clutch.

Figure 7:
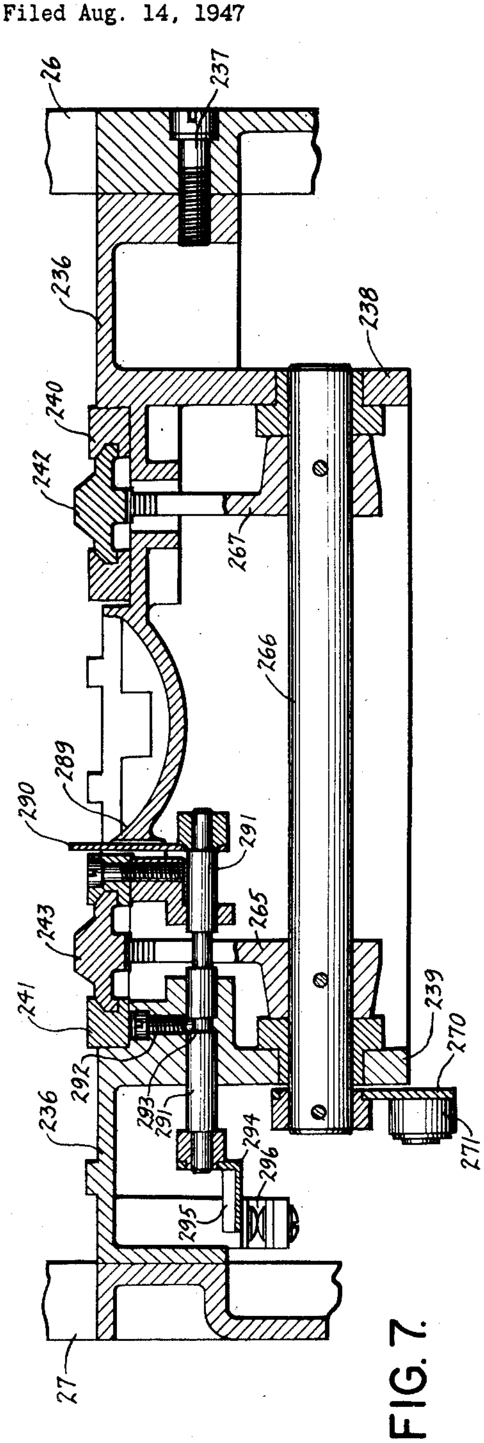

Fig. 7 is a cross-sectional elevation view of the magazine and picker devices.

Figure 7A:
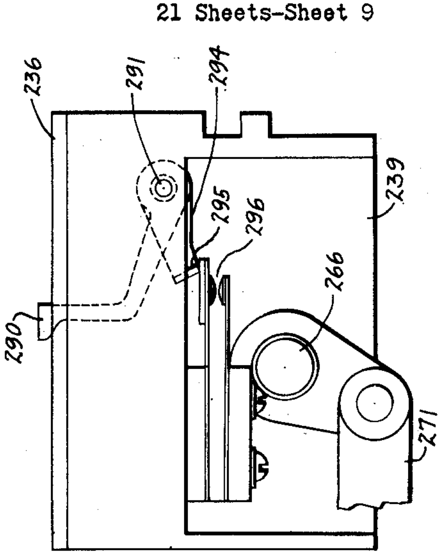

Fig. 7*a* is a detailed sectional view of the hopper lever and hopper contact in the magazine.

Figure 8:
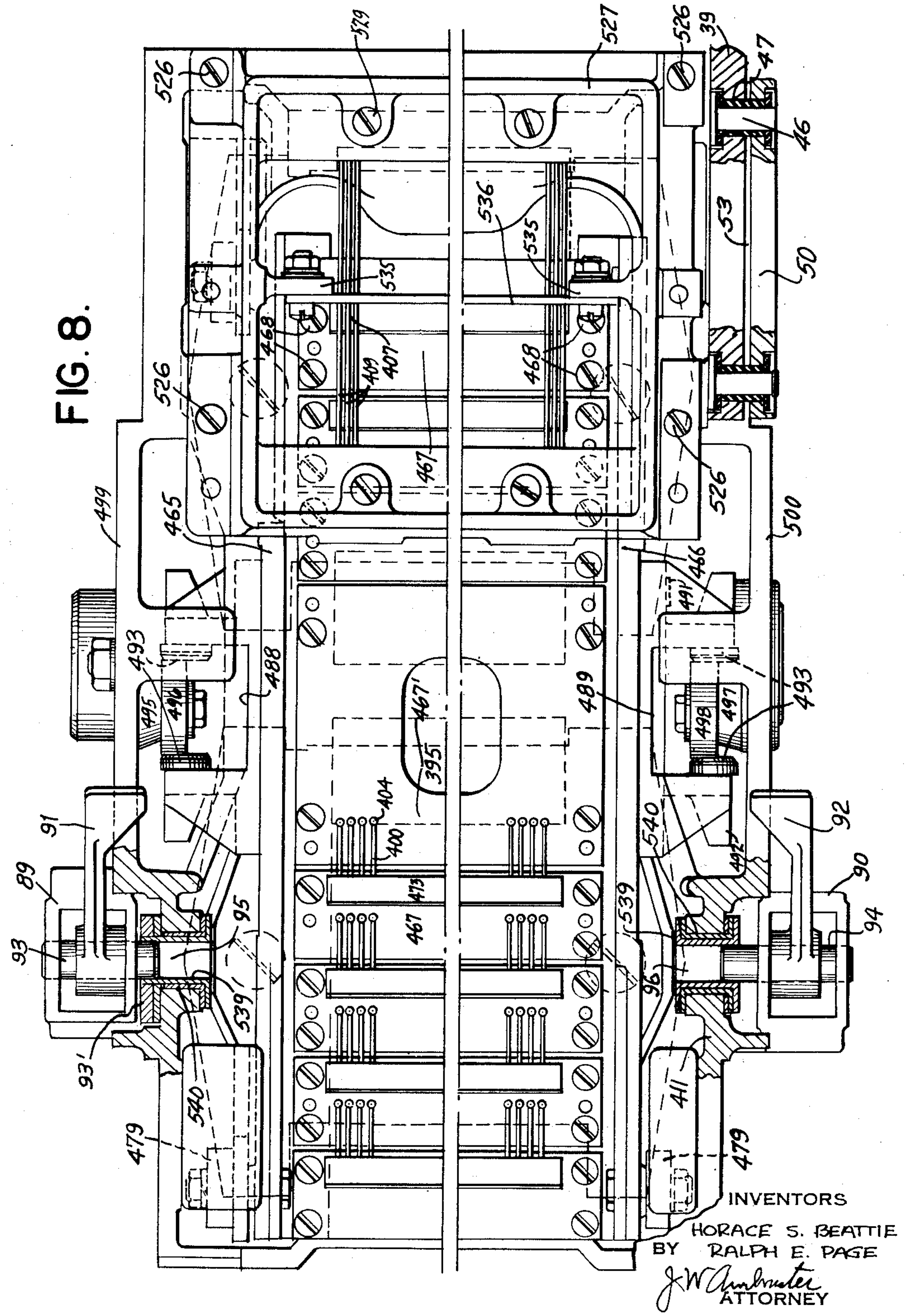

Fig. 8 is a plan view of the two sensing stations.

Figure 9A:
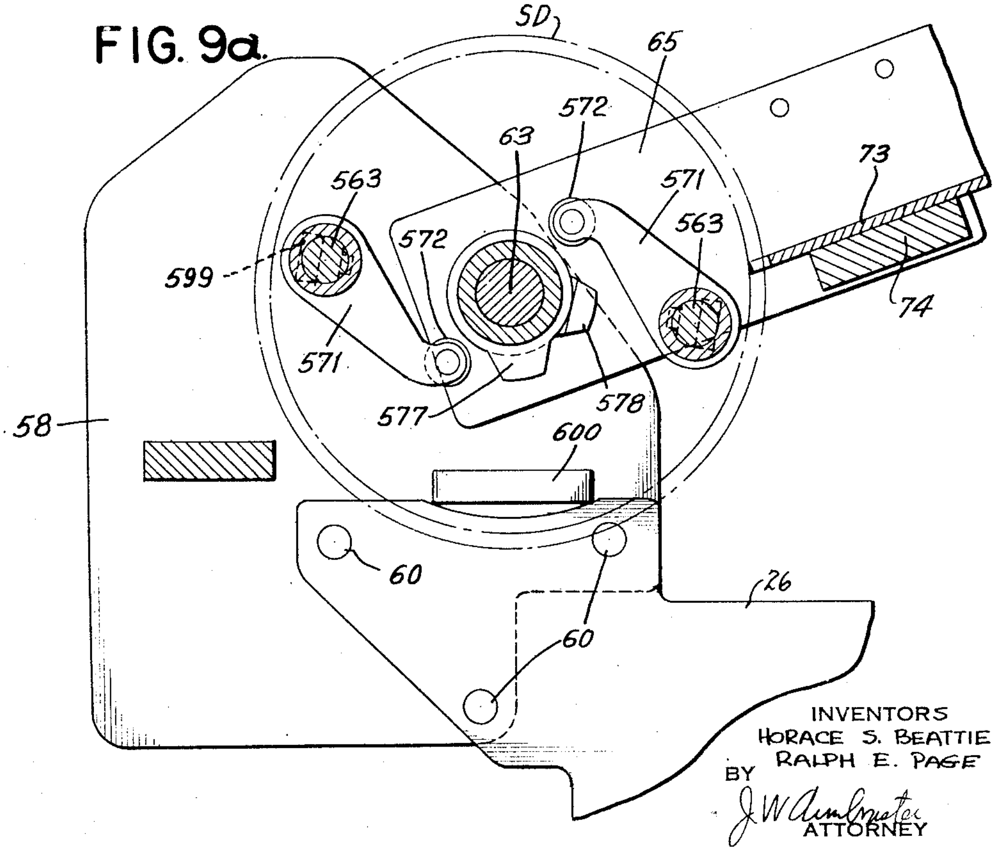
Figure 9:
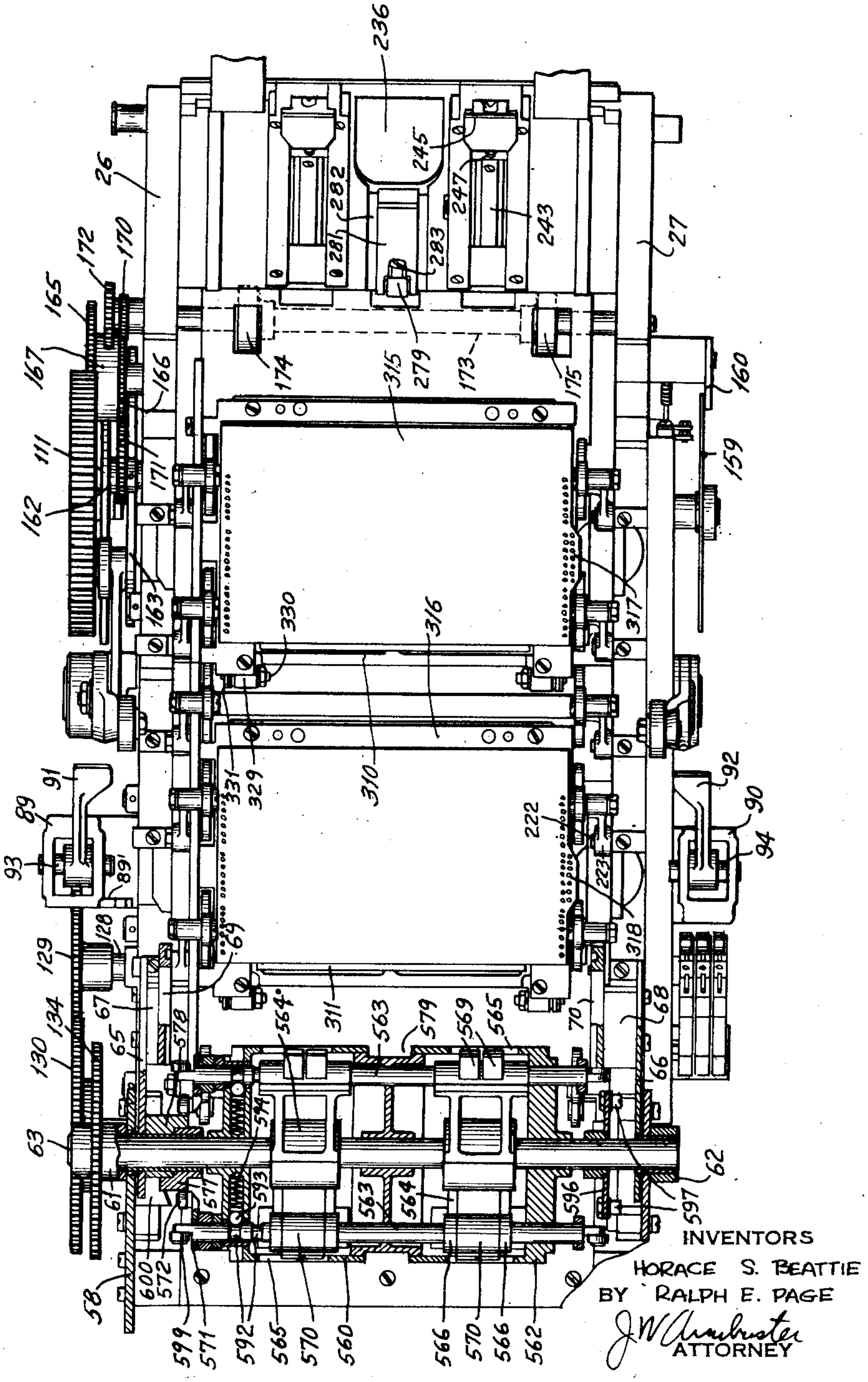

Fig. 9 is a sectional plan view of the entire machine.

Fig. 9*a* is a sectional elevation view showing the stacker clip operating arms.

Figure 10:
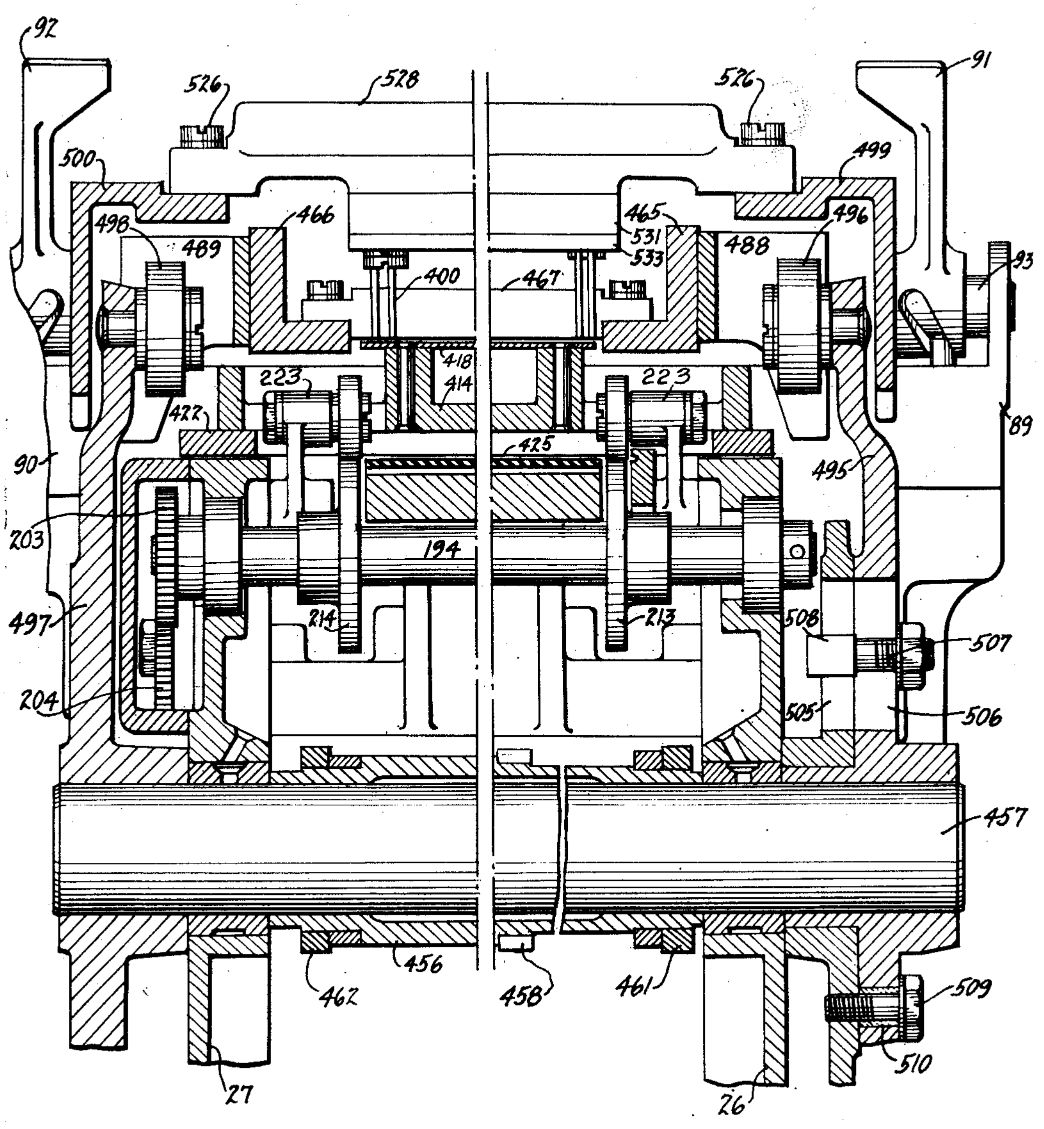

Fig. 10 is a sectional end elevation view showing the large rocking arms for oscillating the sensing lever holder.

Figure 11:
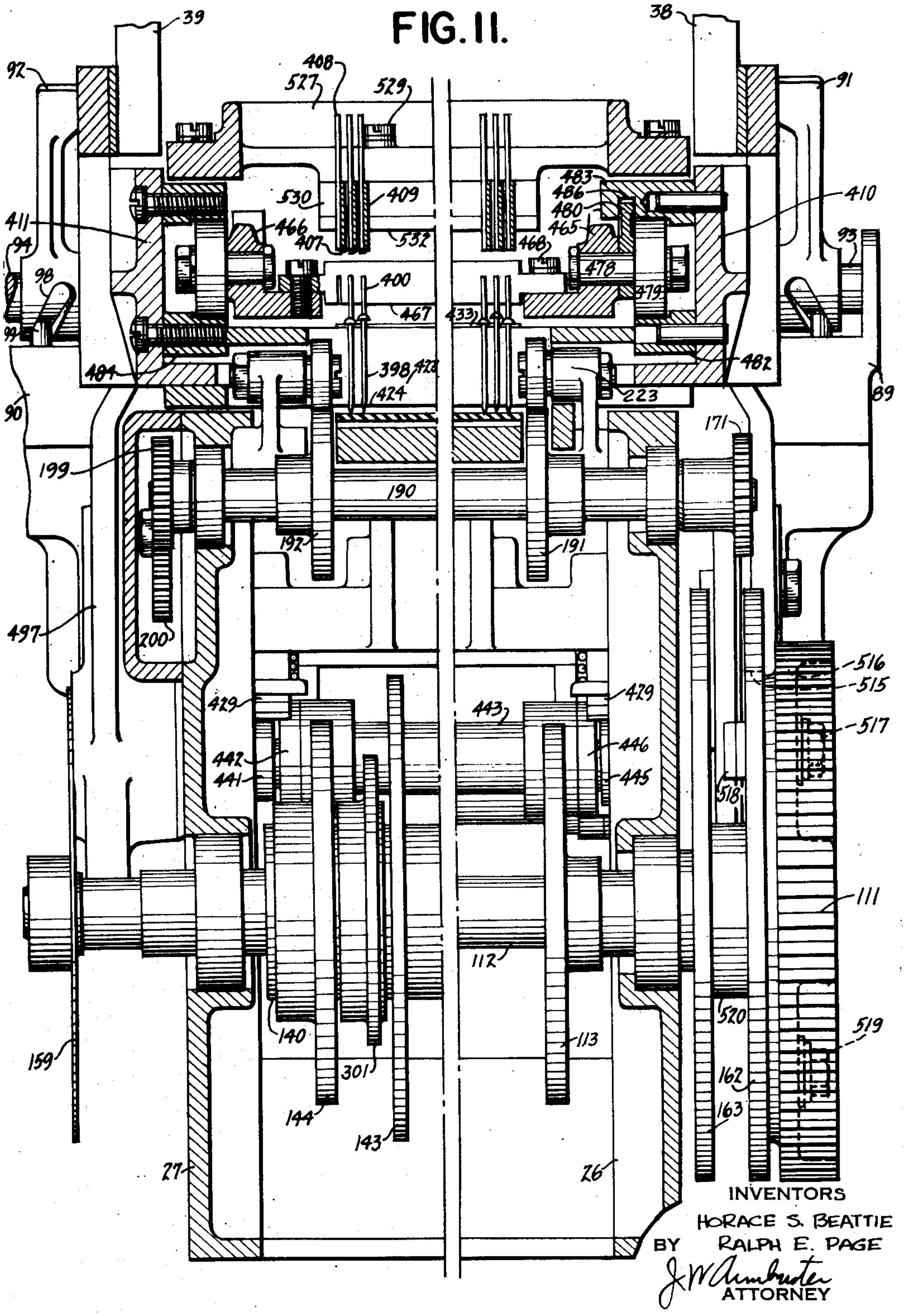

Fig. 11 is a sectional elevation view of the driving gears and the pin sensing devices.

Figure 12:
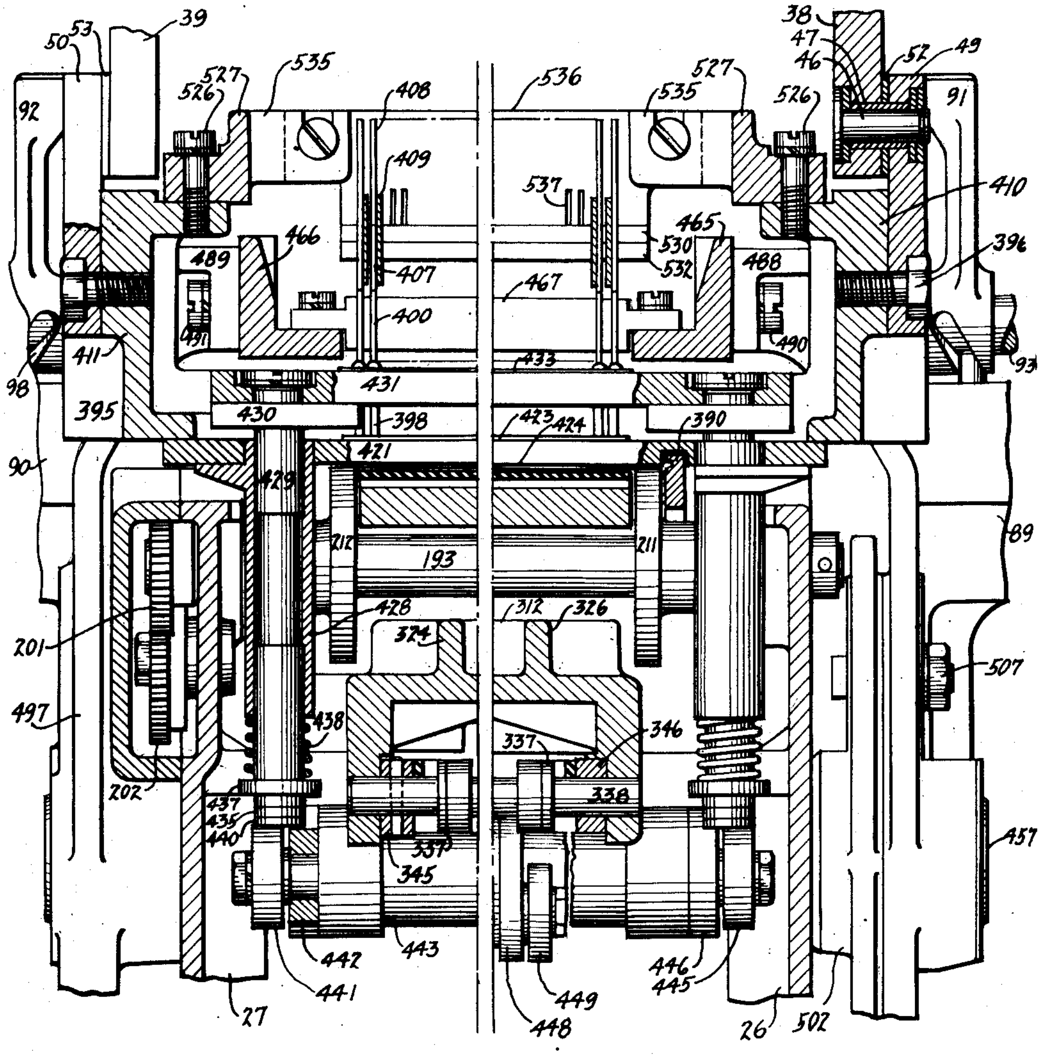

Fig. 12 is an end view in sectional elevation of the pin holder lifting arms.

Figures 13, 14:
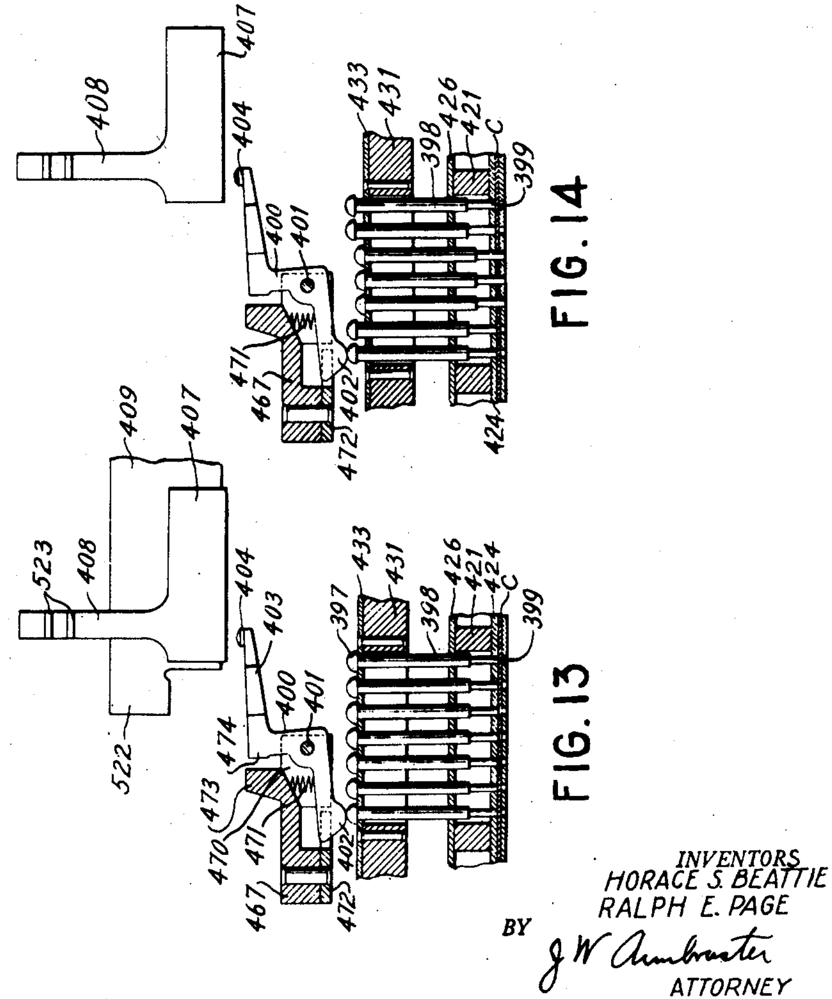

Fig. 13 is a detail view of the sensing devices with the pins lifted.

Fig. 14 is a detail view of the sensing devices with the pins lowered.

Figure 15:
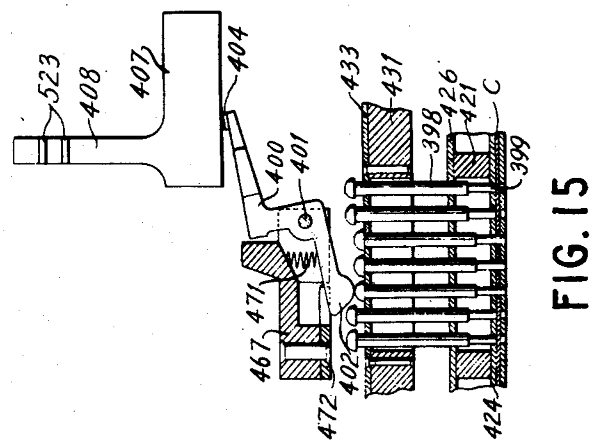

Fig. 15 is a detail view of the sensing devices with selected pins projecting down through perforations and a sensing lever moved thereover.

Figure 16:
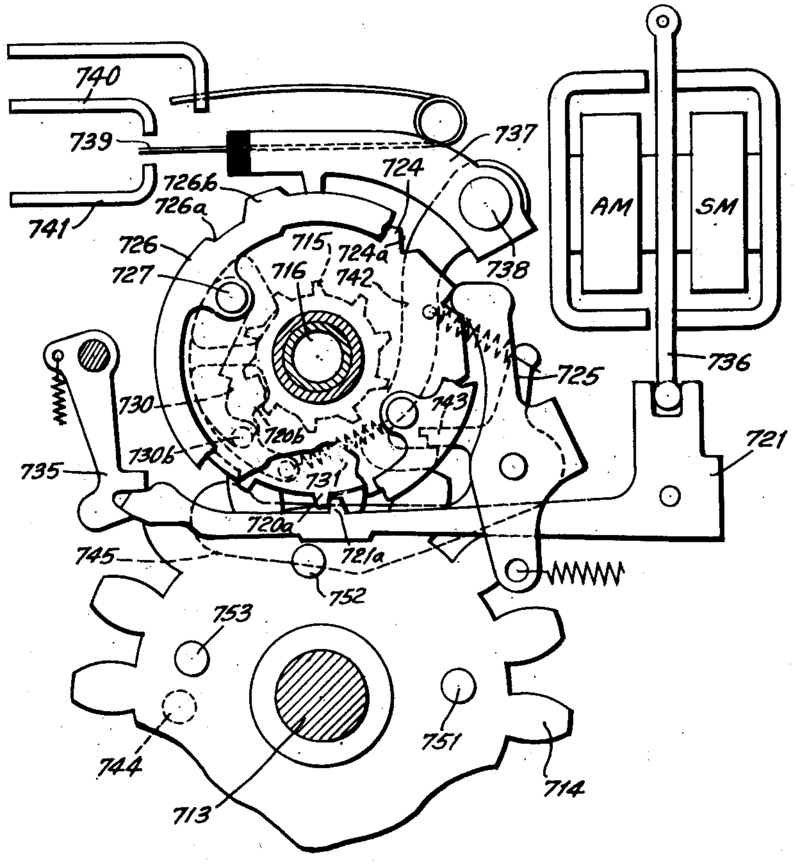

Fig. 16 is a sectional elevation view of an accumulator order with start and stop magnets and carry contacts.

Figure 17:
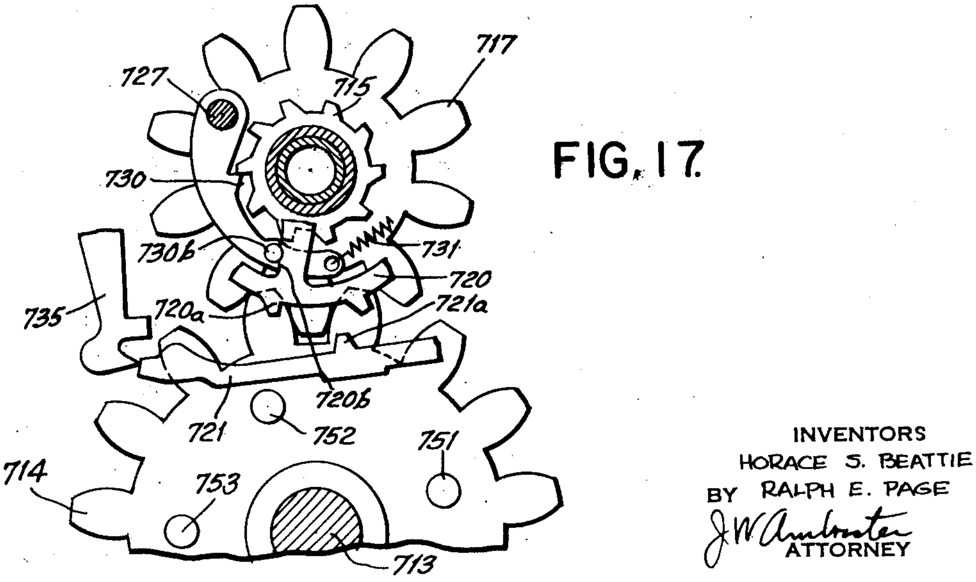

Fig. 17 is a sectional elevation view of an accumulator wheel and associated parts.

Figure 18:
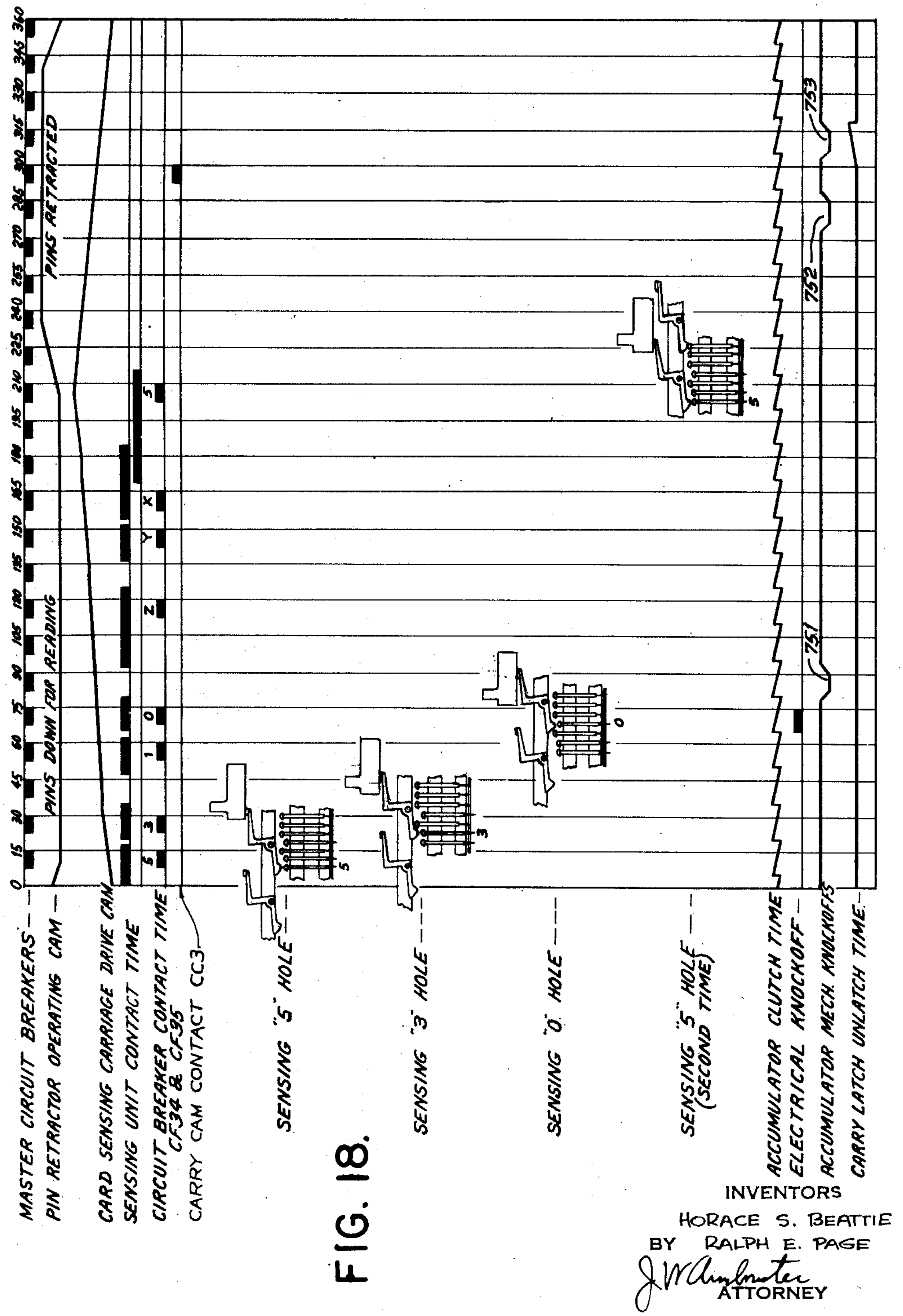
Figure 18A:
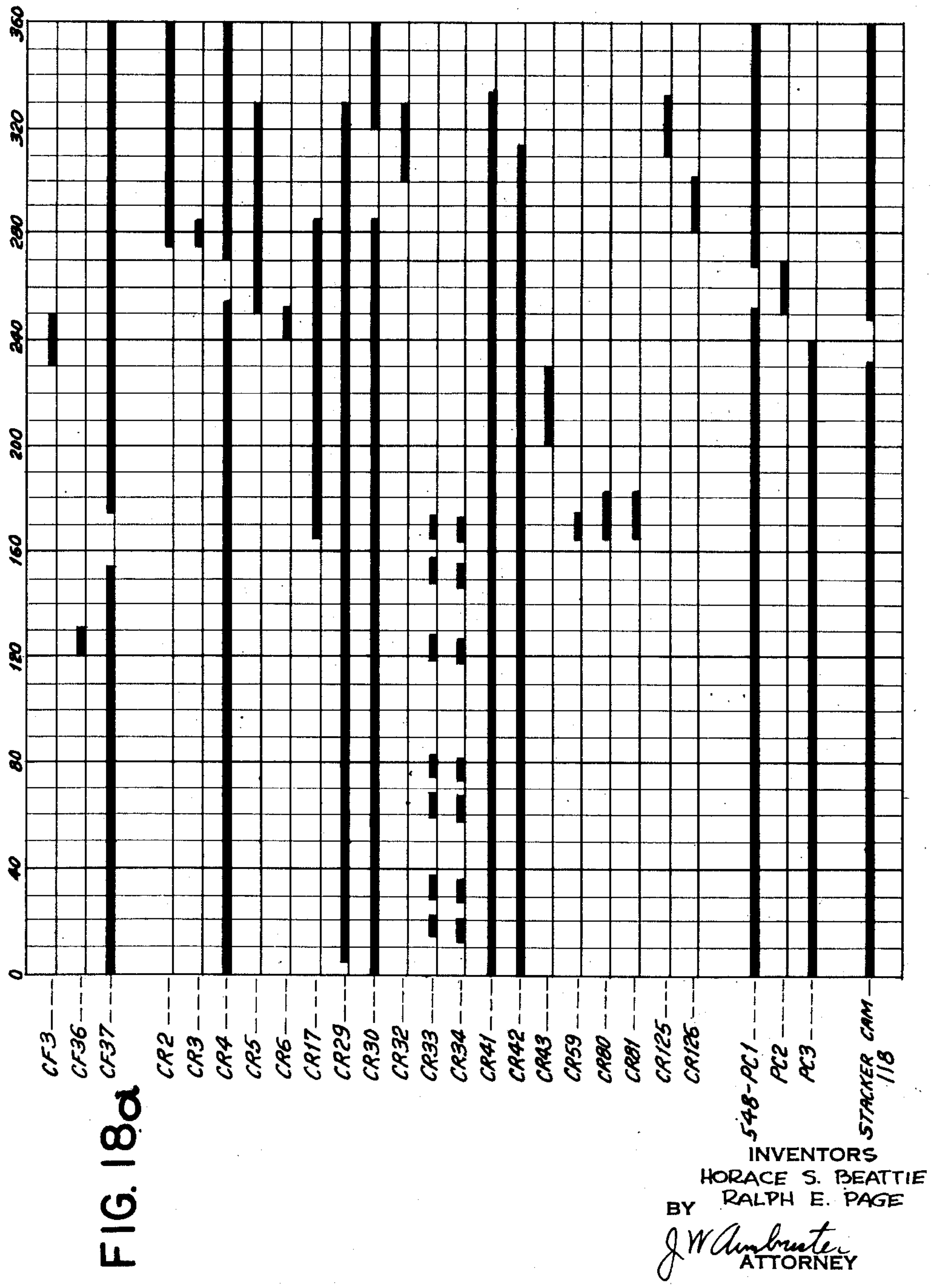

Figs. 18 and 18*a* comprise a timing chart.

Figure 19:
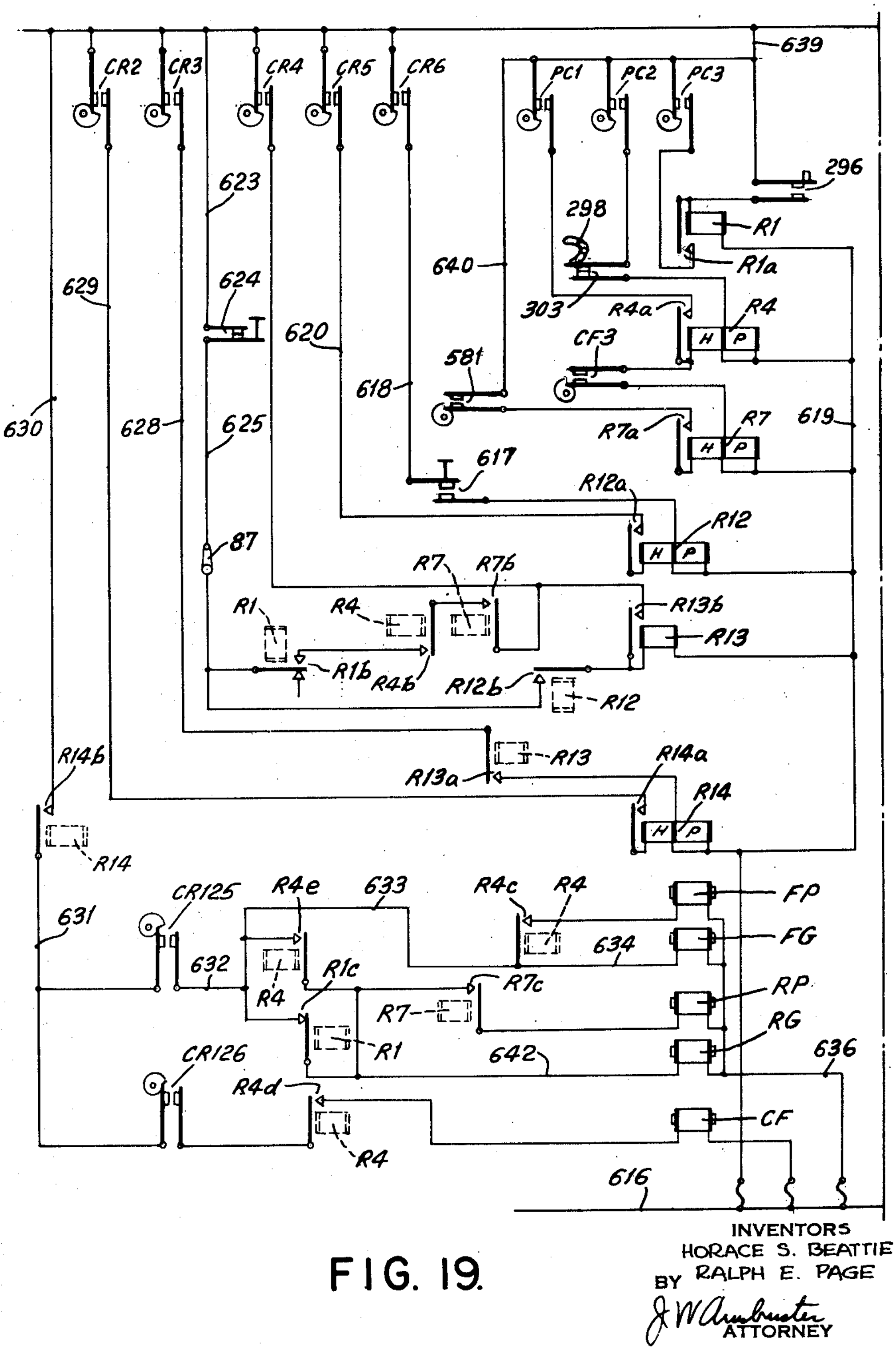
Figure 19A:
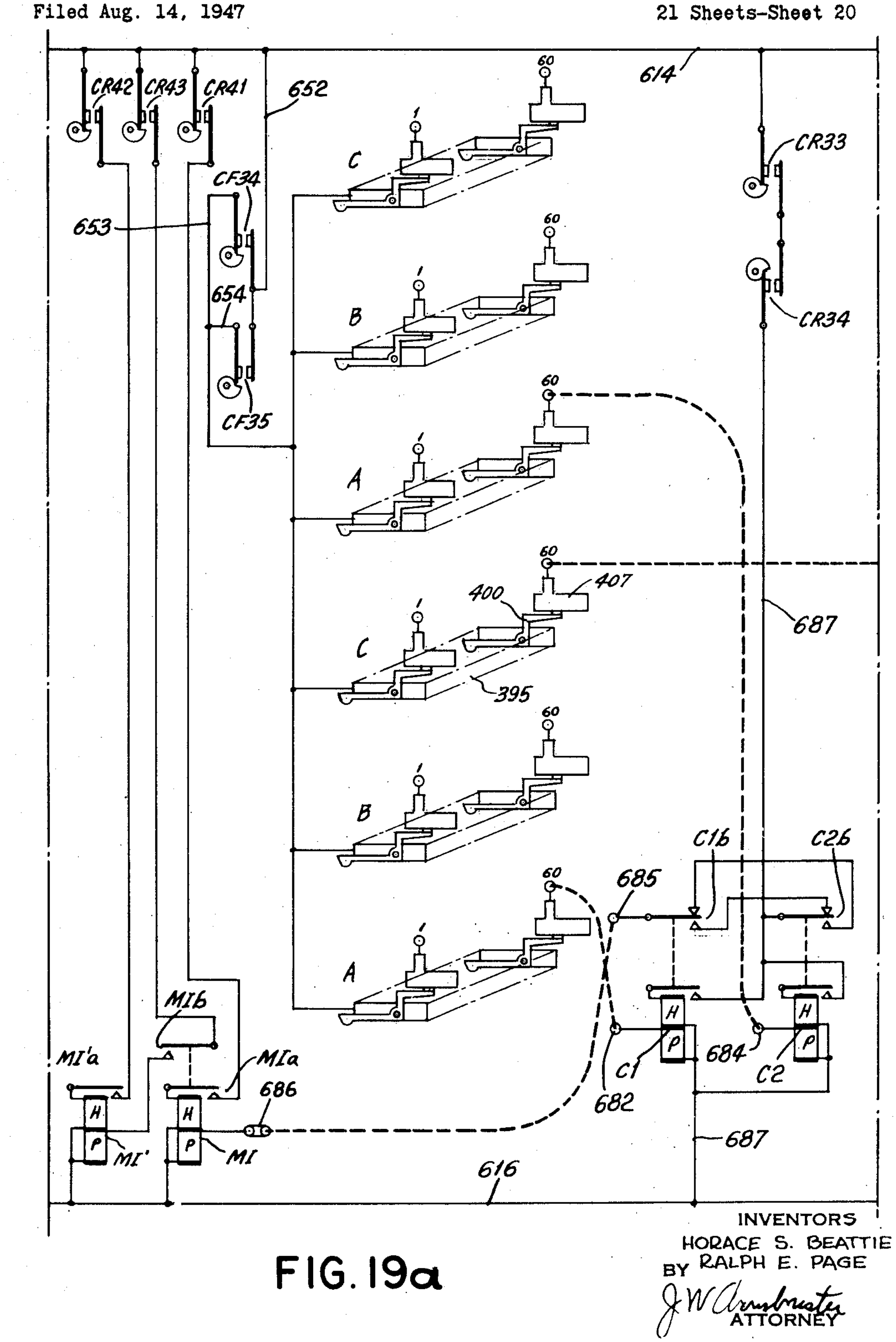
Figure 19B:
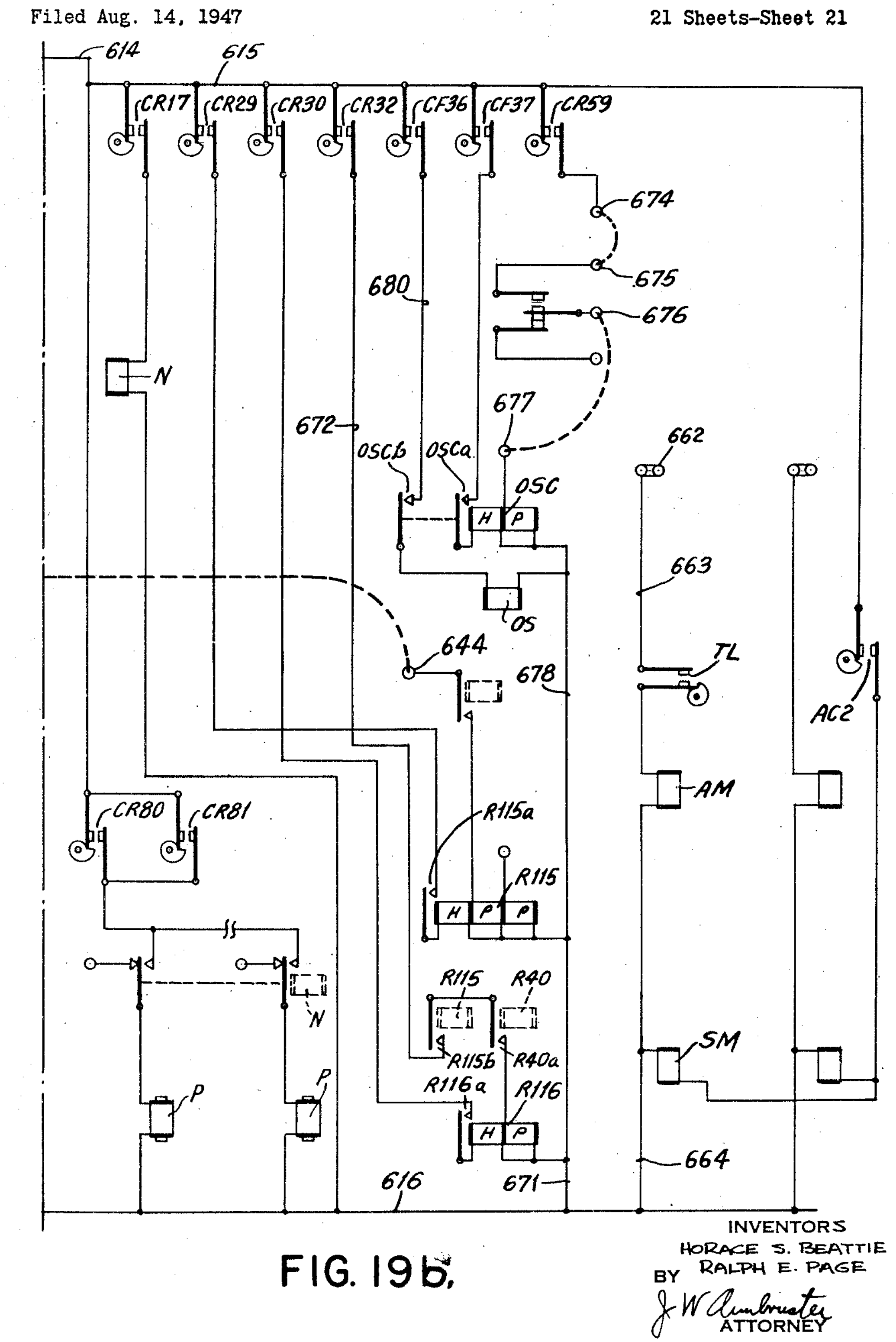

Figs. 19, 19*a* and 19*b* illustrate the wiring diagram.

Figure 1:
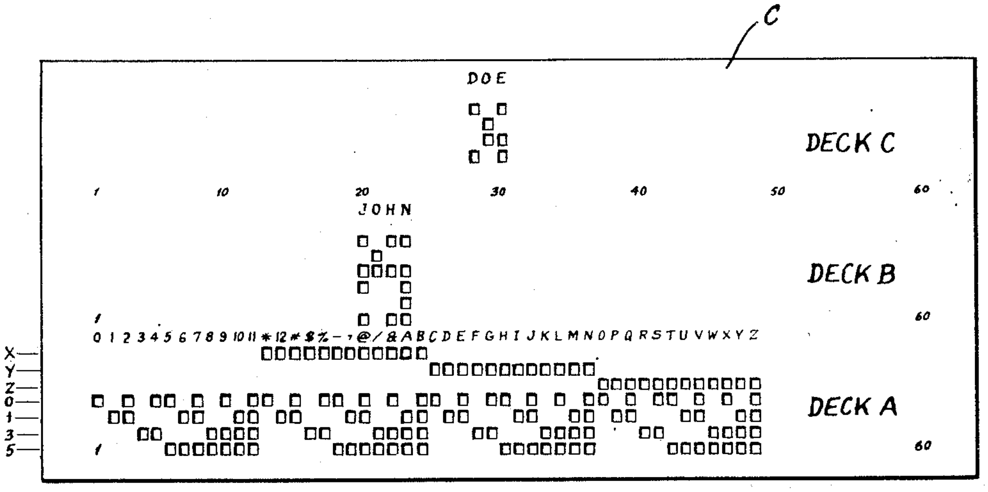
Fig. 1 is a detail view showing a sample three-deck card with the code perforations representing digits, special signs and alphabet characters.

In Fig. 1, it is noted that the card C is of the standard Hollerith proportions and size, but the arrangement of indicia, index points or perforation positions thereon differ in appearing in three decks A, B and C punched in a 7-position code to represent digits, special signs and alphabet characters. Each deck comprises sixty vertical columns of index point positions, each column containing seven positions. The columns of the three decks are in alignment so that, considering the card as a whole, there are twenty-one perforation positions in each vertical column and sixty perforation positions in each of the twenty-one horizontal row positions. Therefore, the card has twenty-one times sixty or twelve hundred and sixty possible perforation positions.

As shown, deck A is perforated with a sample set of perforations representative of all the possible common combinations to represent digits, special signs, and alphabet characters. The characters represented are noted directly above deck A in alignment with the perforations representing each character. To the left of the sample set of perforations and in alignment with the seven rows are the seven code designations X, Y, Z, 0, 1, 3, 5 in order of appearance from top to bottom. These code designations are often referred to in order to point out the perforation positions representative of different characteristics. For example, the digit 4 is represented in this code by a "3" and "0" perforation because at the time the "0" is effective to add a unit. There is a somewhat similar departure from the expected arrangement in the case of the digits 2, 7, 9 and 11, wherein the "0" in code assumes the value of a 1 or a 2. The value of "one" is added for a combination of "1" and "3" and an additional value of "two" is added for a combination of "0," "1" and "3."

Referring to the sample set of perforations, it is noted further that the code punchings from the value 0 to 11 are repeated four times, once without any X, Y or Z perforations and then separately with each one of these special perforations to provide, in addition to the twelve digit representations, thirty-six other representations which are used for special signs and alphabet characters.

In a copending patent application Serial No. 768,640, filed on August 14, 1947, there are set forth claims to the kind of code record card disclosed therein.

The unusual representation of digits, wherein perforations in the 0 code positions at times represent another value other than the code designations would lead one to expect, is of value in accounting control. Since the value is dependent in this case on the timing of electrical impulses from sensing devices cooperating with the perforations, these differences in value are best explained hereinafter in connection with the generation of said impulses.

*General purposes*

The main purpose of the machine is to sense the code perforations in the machine control element C (Fig. 1) and initiate timed electrical impulses representative of data thereon. In so doing, the machine feeds the records successively out of a magazine and thence successively to two sensing stations, after which the card is stacked in a normal or offset position according to whether it is an ordinary item card or a heading card or other special card bearing a special designation. At each of the sensing stations the card is halted momentarily and sensed electromechanically, while in a static condition. Such treatment makes possible the repetitive sensing and repetitive printing or adding control under control of a card which is held in position for more than one sensing cycle. At the two sensing stations, the devices cooperating with the card are substantially the same, and the purpose is to effect the controls commonly known in the art and often referred to as upper and lower stations, between which a group control device can function in a well known manner to test whether successive records belong to the same or different groups by comparisons of group designations thereon.

In the present case, the identifications U and L are applied to the right and left stations, respectively, because they correspond in effect to the usual upper and lower sensing stations of a tabulator, the former of which is known as a control station mainly because of the group control function connected therewith and the latter of which is known as the adding and printing control station because the impulses therefrom are usually directed into accumulators and print control magnets.

In each sensing station there are electromechanical devices comprising a full set of vertical sensing pins, one for each index point position on the card. The pins are normally held elevated until a card stands in the sensing position, and then the pins are lowered so that certain of them project through perforations and the others remain elevated or raised on the imperforate portions of the card. Cooperating with the heads of each column of pins are three contact levers or bell cranks, the one arm of each crank having a cam face which rides over the heads of the seven related pins and, when a pin is in the depressed position, the crank is allowed to rock to close a contact. The cranks are all mounted on a common reciprocating frame which is oscillated over the pin holder after each depression of the pins.

In station U, it is noted that there are only three sets of sensing cranks, one for each deck of sensing pins. The other station L differs in that the cranks associated therewith are arranged in four sets, the extra set forming a function of sensing what is termed the "late 5" impulse. The reason for such an arrangement is to conform with the construction of accumulating and printing devices which require, for example, for the addition of 9 to have one or more impulses distributed over a wide range of time greater than that provided between the code positions 5 and 0 in this present considered 7-hole code. Therefore, in the addition of a large digit (i. e., a digit greater than 5) it is provided that two cranks cooperate in the sensing of impulses to make up the entry of the large digit. This purpose is not only true of the extreme end position, wherein cooperate the two cranks at one side of the sensing unit, but all four sets of cranks have some joint cooperative entry action for the entry of what may be termed early and late 5 values. For example, the first and second cranks cooperate, the second and third cranks cooperate, and the third and fourth cranks cooperate in their entry of values. In other words, cranks in the outer positions have a single purpose, entering either early or late values while the two sets of centralized or intermediate cranks serve a double function in cooperation with two sets of sensing pins.

*Framework*

The mechanism is supported on a base 25 (Figs. 2 and 5) upon which is fastened a pair of side frames 26, 27 between which the majority of operating parts are suspended.

Extending across the space between the side frames are a number of braces comprising two main castings 28 and 29 (Figs. 6 and 6*a*) acting as bearings for most of the lower feed rollers. Other bracing means is provided by a bar 30 extending across the lower left portion of the frames and two others bars 32 and 33 acting as supports for the magnet units of clutch mechanisms. Near the forward end of the frames there is fastened a cross bar 35 which holds the contact members of the circuit breaker devices.

Poised above the driving mechanisms are a pair of pivoted units, one carrying most of the sensing mechanism and the other carrying the stacker drum and receiving hopper. These two pivoted joints are positioned wherein the first is folded under the second. When they are both swung to the open position, access is obtained to the interior of the card feeding mechanisms for adjustment, replacement and repair. When the parts are to be returned to the normal operating position, the sensing device frame is lowered first and then the stacker frame is pivoted over it and latched in a normal sloping position.

The sensing unit frame comprises a pair of heavy side frames 38 and 39 pivoted on studs 40 extending from the outside of the main frames 26 and 27. Attached to the short ends of the lever frames 38 and 39 are studs 42 to which are attached heavy springs 43 tending to rock the sensing frame clockwise to the open position. These springs 43 are not strong enough to lift the sensing unit and merely act as counterbalance means for preventing too sudden dropping of the sensing unit into position. These springs are fastened to studs 44 extending from the front ends of the side frames 26 and 27.

Referring to Figs. 8 and 12, it is seen that the entire sensing unit is insulated from the remainder of the machine by special attaching means between the levers 38 and 39 and the rest of the unit extending over the card feeding mechanism. The special attaching means comprises rivets 46 which are completely sheathed with insulation bushings and washers 47 for holding the auxiliary side frames 49 and 50 to the main pivoted lever frames 38 and 39. At the plane of contact between frames 38 and 49 and 39 and 50, which would ordinarily be metal-to-metal contact, there are interposed sheets of insulation 52 and 53 for further prevention of electrical conduction between the sensing unit and the remainder of the machine.

The castings comprising frames 49 and 50 extend rearwardly and carry other cross bars and castings containing the various sensing mechanisms described more fully hereinafter. It is sufficient to note, at this point, that the swinging sensing unit frame carries all the sensing mechanism directly above the card, i. e., the sensing pins, the sliding cranks cooperating with said pins, and the contact plates with which the siding cranks make contact. When the unit is lifted, direct access is given to the card path and the card in transmit is revealed in cooperation with the upper and lower feeding rollers, so that anything wrong with the card or the feed devices may be observed and corrected without removing any parts.

Extending between the swinging levers 38 and 39, Fig. 6*a*, is a tall casting tipped at an angle of about 20° to form one wall of the magazine M. Below this casting 55 is a bar with a fixed adjustable throat 56 through which the cards pass successively as they are picked from beneath the stack in the magazine.

Figure 2:
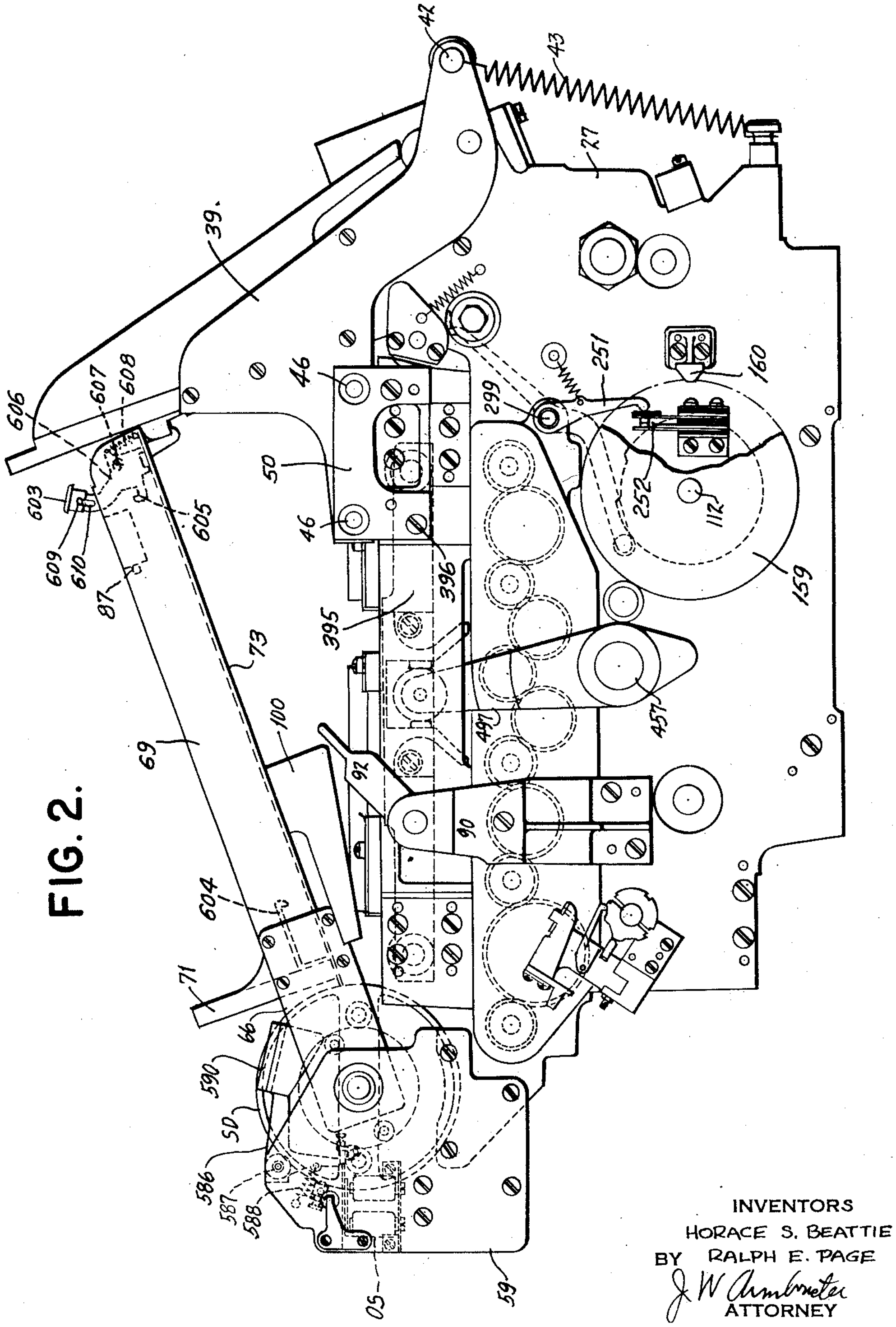
Fig. 2 is a left side elevation view of the entire card sensing machine.

The card stacker is supported on a separate frame secured to the main side frames 26 and 27. Referring to Figs. 2 and 9, it is seen that the stacker side plates 58 and 59 are secured to the rear end of the main side frames by means of a series of screws 60. Extending outside plates 58 and 59 are bushings 61 and 62 forming pivotal supports for the stacker drum shaft 63, on which is pivoted the frame for receiving the stack of cards. Directly inside the plates 58 and 59 is the pair of pivotally mounted plates 65 and 66 which are supported on the bushings for shaft 63 and designed to be rockable about that center.

Secured to the inner faces of pivotal plates 65 and 66 are spacers 67 and 68, to the inside of which are secured the grooved runners 69 and 70 in which the movable card stacking end weight 71 rides. Stacking weight 71 rests against the right face of the stacked cards as viewed in Fig. 2 and, as the cards are stacked, the end is advanced slowly towards the right along the slanted path defined by the grooves in runner guides 69 and 70. A base plate 73 is secured to the underside of the runner guides 69 and 70 to support the lower edges of the stack of cards. Underneath the left side of this base plate is a cross bar 74, Fig. 6, secured not only to the base plate but also to the side plates 65 and 66 to stiffen the entire structure.

At the right end of the stacker base plate 73 there is provided a key operated latch for securing the stacker frame to the sensing unit frame, when they are both in the normal operating position. Fastened to the top of the right end of plate 73 is a bracket 77 carrying a latch 78 pivoted at 79 thereon. Said latch cooperates with a shoulder piece 80 secured to the side of the magazine frame 55. A spring 81 tends to hold a latch in engagement.

Also pivoted on bracket 77 at center 83 is another key lever 84 cooperating with a lock extension on the end weight 71 to hold it in the extreme position when the stacker is tipped back. The latching devices are operated when it is desired to open the feed unit, and this is the first step in releasing the stacker unit so that it may be swung back in the counterclockwise motion about shaft 63.

An interlock is provided so that the latching devices of the stacker frame cannot close as long as the sensing unit frame is elevated or out of its locked lower normal position. As a result of the inoperative condition of the latching devices, switch contacts 86 associated with the latch mechanism serve to break a contact through the driving mechanism, so that the devices cannot be operated as long as the swinging frames are out of the normal position.

Figure 5:
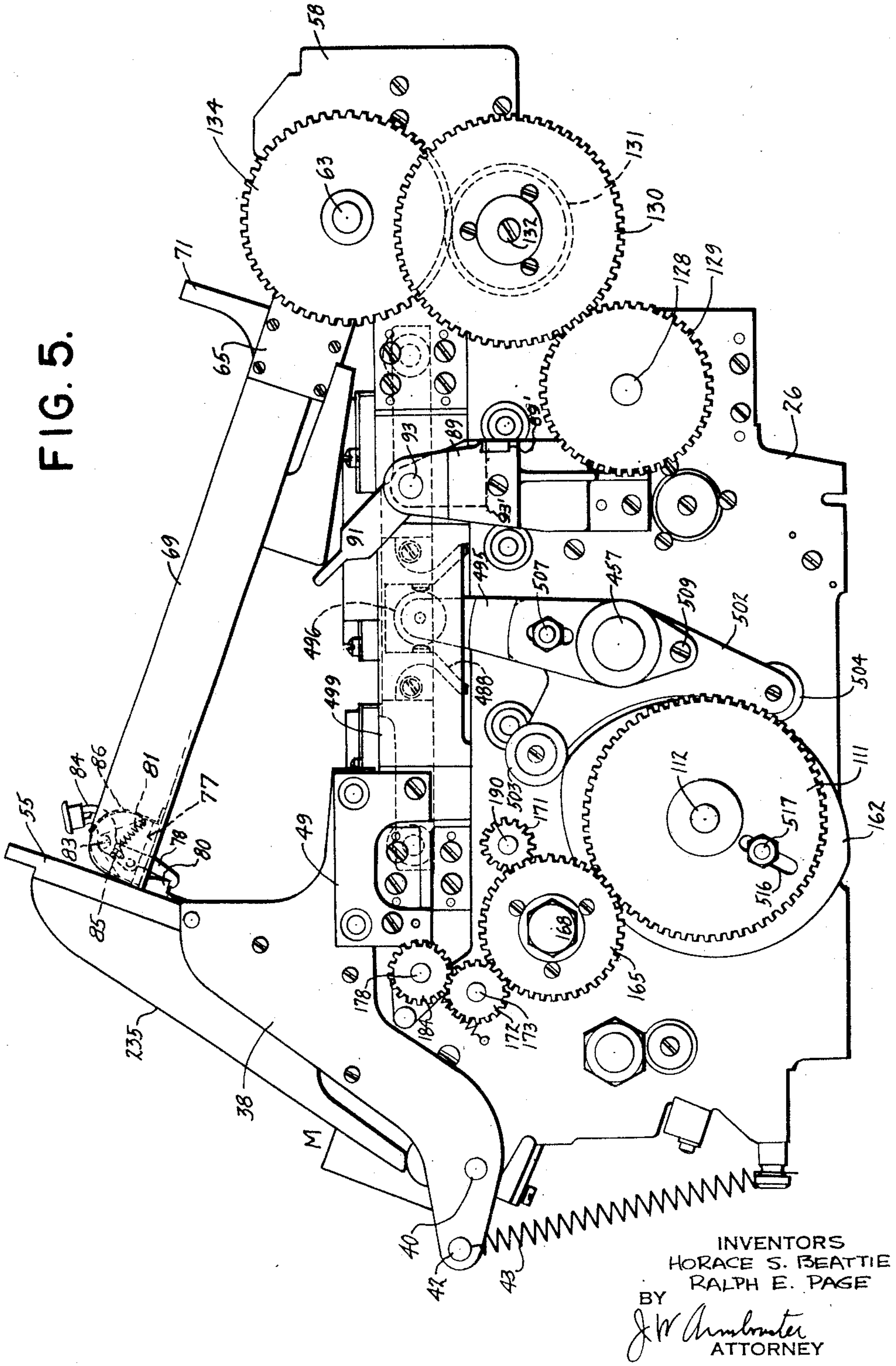
Fig. 5 is a right side elevation view of the entire card sensing machine.

As part of the interlock mechanism, it is noted in Figs. 2 and 5 that extending upwardly from brackets 89 and 90 fastened to the side of the stationary main side frames 26 and 27 are a pair of upwardly extending locking levers 91 and 92. Attached to the levers 91 and 92 are sliding pivots 93 and 94 (Fig. 8) extending in a horizontal direction through openings in the supporting frames 89 and 90, the inner ends acting as locking bolts by projecting into openings 95 and 96 formed in the sides of the swinging frame. Both levers are formed with helical slots 98 (Fig. 11) into which there project pins 99 extending upwardly from a shelf on the brackets 89 and 90.

In order to raise the sensing unit and swing it upward about its pivot, the levers 91 and 92 must be rocked to withdraw the bolts 93 and 94 from the openings in the swinging frame. When so rocked, the levers stand in a position blocking the return of the stacker unit. The upper ends of the levers are in the path of wings on the lower base plate of the stacker and prevent its downward movement to the normal latching position. However, as soon as the sensing unit is restored to the normal position and the levers are rocked fully clockwise, they are removed from the interfering position with the interlock wings 100 fastened to the underside of the stacker and latch 78—80 may then operate to not only hold the stacker down but also close the switch to allow running operation.

*Driving mechanism*

Since the devices under consideration are designed particularly for card handling and sensing operations, it is apparent that they are adapted for coordination with various types of machines, in fact, any machine suited for control by records carrying data indicia representations.

Figure 3:
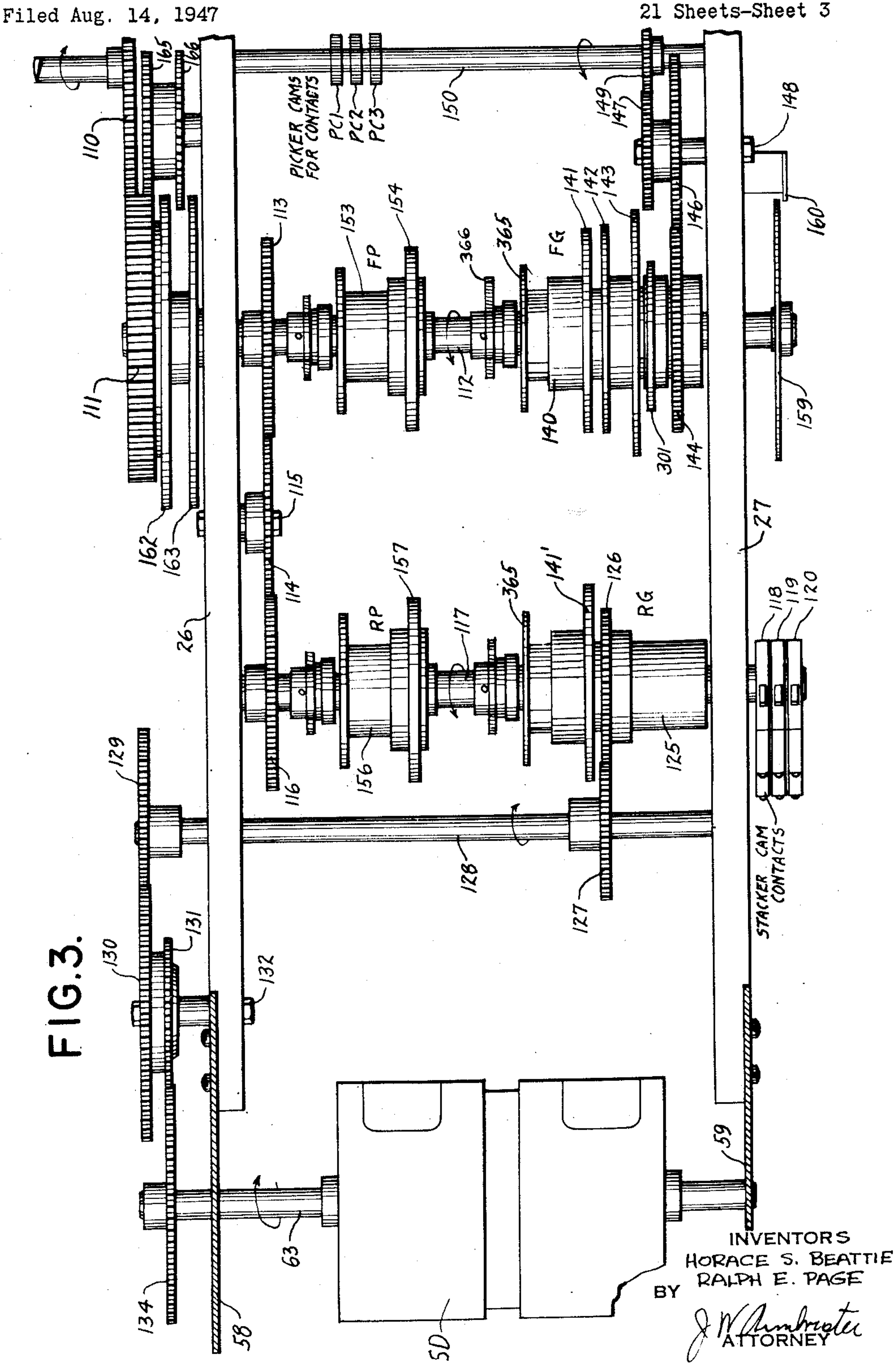
Fig. 3 is a plan view of the driving connections to the main operating shafts and the connections from the clutches thereon.

In Fig. 3, showing a representation of the driving mechanism, the driving gear 110 is operated in a clockwise direction by any of the various accounting machines in the tabulating line and said gear is used to drive the present card feeding and sensing unit. It will be realized that the gear 110 is proportioned according to the various driving ratios between the particular machine carrying it and the present card handling devices. The proportions are such as to operate the machine in synchronism so, for example, if it is a tabulator, the adding devices are moved so that digit accumulation control is possible by control from electrical impulses derived from the card sensing unit.

Gear 110 meshes with the main driven gear 111 which is fastened to the main driving shaft 112. Mounted on shaft 112 and alongside the inner face of the right side of frame 26 is a connecting gear 113 in mesh with an idler gear 114 pivoted on a bolt 115 secured to frame 26. Gear 114 also meshes with another gear 116 fastened to a secondary drive shaft 117 at a position adjacent the inner face of frame 26. Shaft 117 revolves freely in the main side frame and extends beyond the left side of frame 27 and has secured thereon a series of three circuit breaker operating cams 118, 119 and 120.

Freely mounted on the secondary drive shaft 117 is a clutch drum or spool 125 which is connected to shaft 117, whenever a gate is to be operated to release a record card for advancement, said record card at the time being under the second sensing station L after sensing has taken place. In other words, whenever the record card is released for stacking operation, not only is the gate lowered to allow its advancement but gearing connections are established by the same clutch to initiate movement of the stacker drum to pick up the card due to the connections about to be described.

Carried on the clutch spool 125 is a gear 126 in mesh with another gear 127 fastened to a stacker driving shaft 128 extending across the machine and projecting outside the right side frame 26. Secured to the right end of shaft 128 is a gear 129 in mesh with an idler gear 130 which is part of a compound set of gears including a smaller gear 131, both of said gears being loosely pivoted on a bolt 132 extending outwardly from the right side frame 26. In mesh with the smaller gear 131 of the compound gears is a gear 134 fastened to the right end of the stacker drum shaft 135, which is pivoted in the stacker side plates 58 and 59. By means of the driving connections already noted, the stacker drum SD is rotated in a clockwise direction far enough to pick up a card and deposit it on the stacker tray for each revolution of the clutch spool 125.

It is already mentioned how the main driving shaft 112 is operated by cooperation between the outer driving source as represented by gear 110 and the main driving gear 111 fastened to the shaft. The shaft also carries a clutch spool 140, said clutch being provided primarily for the purpose of opening the gate which stops the record card under the first sensing station U. In other words, just as the clutch spool 125 serves to control operations in connection with the second gate of the sensing station L, the clutch spool 140 serves to cooperate with the stopping gate of the other sensing station U. This clutch related to spool 140 serves a fourfold purpose, in that it not only regulates the opening of the gate for advancement of the card beyond the first sensing station, but it also has mounted thereon a pair of complementary cams 142 and 143 for operating the picker knife to advance records successively out of the magazine. A third control by a cam thereon over a card lever is noted hereinafter. The fourth function performed by the clutch spool is that of operating a circuit breaker shaft by means of a gear 144 fastened to the spool. This gear is near the inner face of the left side frame 27 and meshes with the large gear 146 of a pair of idler compound gears including a smaller gear 147, both being connected by a hub which is loosely mounted on a bolt 148 secured to frame 27. Gear 147 meshes with a gear 149 which is fastened to the circuit breaker shaft 150 extending between the main side frame and used to carry the camming devices for controlling the opening and closing of picker contacts P used to regulate the general operating conditions of the machine.

It is noted hereinbefore that the two clutch spools 140 and 125 are mounted on the front and rear drive shafts, respectively, for the purposes of operating the two gates to regulate the advance of the record. There are two other clutch spools loosely mounted on these same shafts for the purpose of elevating and lowering pin holding devices. One clutch spool 153 is loosely mounted on the main driving shaft 112 and carries a cam 154 which is effective whenever the clutch is operated to raise and lower the pin holder poised above the card in the first sensing station U. The other clutch spool 156 is loosely mounted on the secondary drive shaft 117 and carries a cam 157 which operates devices for raising and lowering the pin holder cooperating with the record card standing in the second sensing station L.

Attached to the left end of the main driving shaft 112 outside the left side frame 27 is an index disk 159 which makes one revolution for each complete operating cycle of the machine. This disk is marked with graduations for dividing the cycle into a number of equal circumferential divisions which may be noted in conjunction with a fixed index pointer 160 extending from the frame 27. The index disk is used for timing and regulating purposes for adjusting the various cam contact openings and closures, as well as observing the other mechanical and electrical times of operation and checking them with a known standard.

A pair of complementary cams 162 and 163 are fastened to the main driving shaft 112 just outside the outer face of the right main side frame 26 and adjacent to the main driving shaft gear 111. These two gears are used to rock a frame which carries the pin sensing cranks back and forth horizontally to sense the heads of the raised and depressed pins cooperating with the perforated records.

*Feed roller drive*

Figure 4:
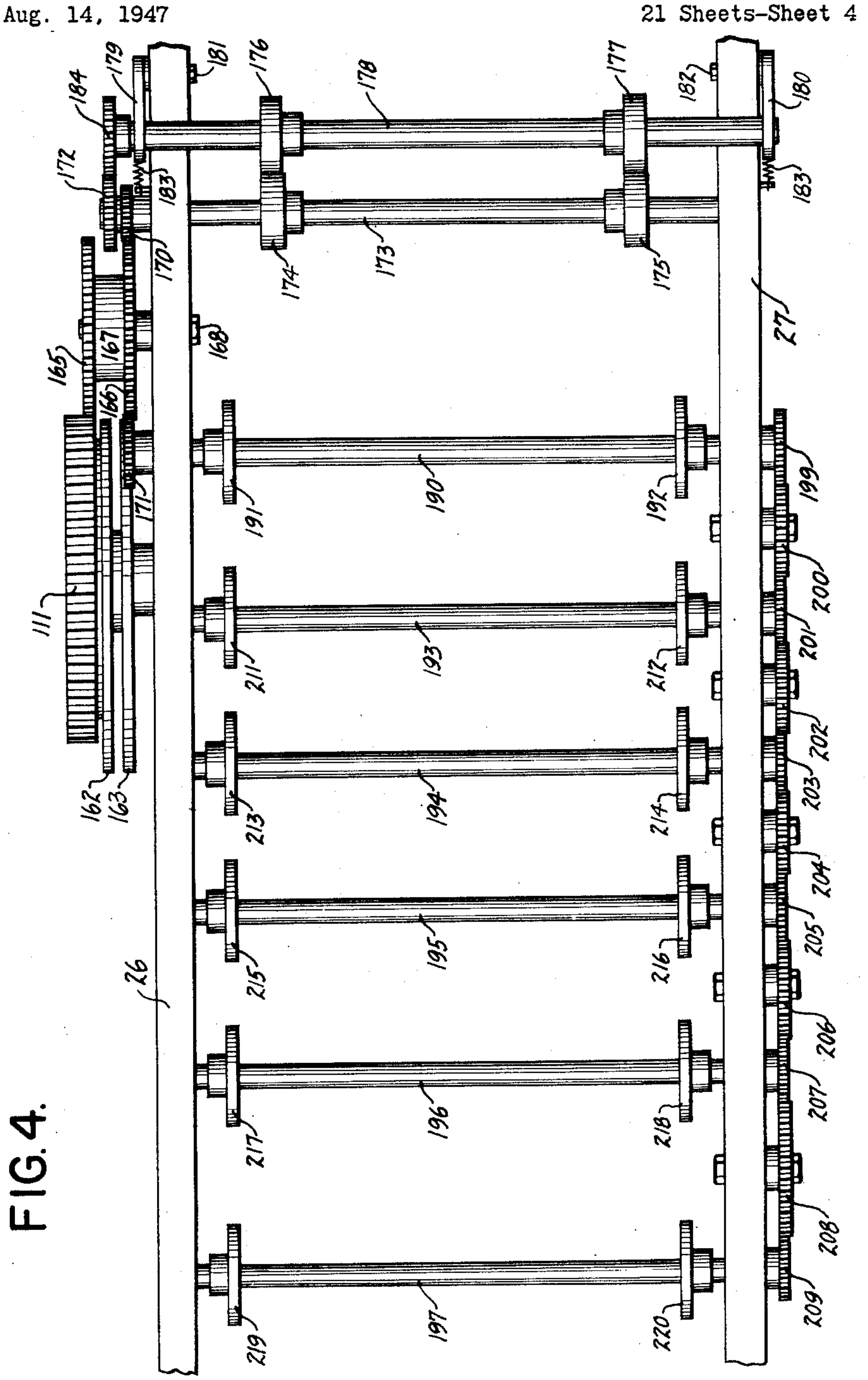
Fig. 4 is a plan view of the driving connections to all the feed rollers.

Fig. 4 is a plan view showing diagrammatically the main driving connections to the feed rollers for advancing the records successively from right to left from the magazine to the stacker. The main driving connection to the feed rollers is established through a compound gear made up of gears 165 and 166 joined by a hub 167 which is loosely mounted on a stud 168 extending from the outside of frame 26. The compound gear is mounted as an idler between the main drive gear 111 in mesh with gear 165 and two driven pinions 170 and 171 in mesh with the other gear 166. Pinion 170 carries the driving connections to the preliminary upper feed while the other pinion 171 carries the driving motion to the left through the successive sets of feeding rollers leading to the stacker.

Considering first the feed rollers associated with the card as it leaves the magazine, it is noted that pinion 170 is connected to another gear 172 and also fastened to the shaft 173 which carries the pair of first feeding rollers 174 and 175 which engage the lower surface of the card as it appears out of the magazine. This shaft 173 is mounted in fixed bearings in the main side frames 26 and 27, and cooperating with the rollers 174 and 175 thereon is a pair of upper rollers 176 and 177 mounted on a shaft 178 which is in turn supported on the ends of arms 179 and 180 pivoted at 181 and 182 on studs fixed to the side frames 26 and 27, respectively. A pair of springs 183 attached to the ends of arms 179 and 180 tend to rock the arms downward, so that the feed rollers 176 and 177 are forced against rollers 174 and 175 to hold the card between the two sets of rollers. The springs also serve to rock shaft 78 so that a gear 184 on the right end of shaft 178 is maintained in mesh with the gear 172 fastened to the other feed shaft 173. These last mentioned rollers cooperate with each issued card as soon as it extends beyond the throat of the magazine and serve in an almost positive manner to advance the record up to the first pair of impositive skid feed rollers wherein the card is merely urged towards the first gate where it is merely held there by frictional contact between feed rollers rather than a strong driving action, such as that exercised by rollers 174—177.

After the card leaves the magazine and the first set of rollers associated therewith, it is advanced successively through six sets of rollers before being clipped on the stacker drum. Each of these six advancing means comprises a lower pair of rollers which are positively driven and an upper pair of rollers spring-held against the lower rollers. The six sets of lower rollers are driven successively through idler gears between the various shafts, and the drive is originated at the forward end of the feed unit through the drive gear 166 in mesh with a pinion 171 which is fastened to a shaft 190 carrying the first pair of lower rollers 191 and 192. This shaft 190 as well as the other five shafts 193, 194, 195, 196 and 197 are all loosely pivoted in bearings in the two main side frames 26 and 27 and they all extend beyond the left side frame 27 and carry pinions to receive the driving action which is communicated through idler gears. Starting with a pinion 199 which is fastened to the left end of shaft 190, the drive continues successively to the other feed roller shafts through connections including idler gear 200, a pinion 201 on shaft 193, an idler gear 202 and a pinion 203 on shaft 194, an idler gear 204, a pinion 205 fastened to shaft 195, then through an idler 206 and a pinion 207 fastened to shaft 196 and finally through an idler 208 to the pinion 209 fastened to the end of the last feed roller shaft 197. The idler gears 200, 202, 204, 206 and 208 are all mounted on studs secured to the left side frame 27.

Since each feed roller shaft is provided with a pair of lower driving rollers, it is believed well to identify these rollers separately. Rollers 211 and 212 are on shaft 193. Rollers 213 and 214 are fastened to shaft 194. Rollers 215 and 216 are on shaft 195. Rollers 217 and 218 are attached to shaft 196. The final pair of rollers 219 and 220 is attached to shaft 197.

It will be understood that the card rides over the six pairs of positively driven rollers shown in Fig. 4, and that these rollers underlie the margins running parallel with the two ends of the card. Cooperating with each of these twelve rollers is a smaller upper skid roller resting thereon and adapted to bear down on the upper surfaces of the card to pinch lightly the marginal area between the skid roller and the positively driven lower roller. Since all twelve of these upper roller constructions are similar, a description of one will suffice with reference to the details shown in Figs. 9 and 10. There it is seen that a stud 222 projects inwardly from the main frame and it carries loosely mounted thereon an arm 223, the free end of which is formed with a bearing 224 through which there extends the small shaft 225 for supporting the roller 226. The opening end in hub 224 is large enough to provide for angular adjustment of the shaft 225 which is adjusted to either a straight or angular position and fastened there by an arcuate nut 227. The idea of the angular adjustment is to provide means for insuring that the record card is aligned with respect to one margin thereof. For example, the upper feed rollers cooperating with rollers 191 and 192 are adjusted at an angle, so that the upper roller is directed towards the upper left hand corner of the plan view as seen in Fig. 4 to direct the card at a slight angle as it passes into the first sensing station U so that the right margin or upper edge, as viewed in Fig. 4, is brought against a side rail 390, Fig. 9, and the card will be aligned when it is at the first gate, so that the front edge rests against the gate and the right side margin rests against a side rail near the inner face of the side frame 26. The right hand set of skid rollers are made of rubber or similar frictional material while the left hand set of rollers are metallic and not so frictional to accentuate the aligning action.

It is understood that pairs of upper rollers will be adjusted so that this angular side movement is to be synchronized, and that the side adjustment is repeated for both sensing stations. A small spring 228 is attached to arm 223 and exerts a slight amount of pressure to draw the small upper feed roller down into contact with the card and the lower roller, so that a frictional driving connection is established, tending to advance the record but failing to exert any appreciable force against a record which is stopped by a gate.

*Card magazine and picker mechanisms*

The bunch of record cards which are to be analyzed are placed in the magazine and there they are picked off successively from the bottom of the stack and sent through the feeding rollers. The cards are placed in the stack face down with the lower part of the "A" deck leading and the first column at the right-hand side, when looking at the feed unit from the magazine end.

It is already noted that the magazine includes a front wall or vertical plate 55 which is tipped at an angle to define the starting points of the front edge of the cards in the magazine. Attached to this wall 55 is a pair of wings 235 for guiding the side edges of the cards as they rest in the magazine. The lower portion of the magazine comprises a large casting 236 (Fig. 7) which extends across the machine between main side frames 26 and 27 and is secured thereto by a number of screws, such as the one 237 shown in the sectional view. This casting 236 is formed to receive the sliding picker mechanism as well as the rotating operating means therefor and an empty hopper detector or card lever means for electrically sensing the presence of cards in the magazine. In the sectional view the casting 236 is seen to have a top web as well as a pair of side flanges which are used to secure it to the side frames. It is also formed with a pair of inner walls 238 and 239 in which are supported the rocking picker and detecting mechanisms.

Attached to the top of the casting is a pair of guides 240 and 241 formed with horizontally dove-tailed grooves for receiving the slides 242 and 243 carrying the picker knife frame as shown in the sectional side elevation view (Fig. 6*a*). The picker knife 245 is adjustably secured on a block 246 which has a plunger 247 extending therefrom into the slide 243. A set screw in slide 243 locks the plunger 247 in position to hold the entire horizontally sliding structure together. The floor of the magazine is not parallel with the base of the machine but is tipped at an angle of 20° to form an angle of 90° with the front wall of the magazine.

Referring to the sectional view (Fig. 6*a*), it is seen that the picker slides 243 are formed at the lower edge with a series of rack teeth engaged by a sector 265 fastened to a shaft 266. In Fig. 7, it is noted that shaft 266 extends across the magazine and is held in bushings attached to the two walls 238 and 239 of the main magazine casting. The two sector arms 265 and 267 are attached to shaft 266 in positions wherein the teeth thereon cooperate with the rack teeth on the underside of the two picker slides 242 and 243. At the left end of shaft 266 there is an extension outside the wall 239 and attached to the shaft is an operating arm 270, to which is articulated a link 271 extending rearward (Fig. 6*a*) and at its other end pivotally attached to a stud 272 on the top arm of a lever 273 pivoted on shaft 274 and provided with a pair of rollers 275 and 276 cooperating with the pair of complementary cams 142 and 143 already mentioned as being attached to the clutch spool 140. Whenever the clutch is connected to open the first gate to permit advancement of records, the cams are rotated and lever 273 is rocked in a clockwise direction, pushing on link 271 and rocking both sectors 265 and 267 in a counterclockwise direction to advance the picker slides 242 and 243 and knives 245 connected therewith to pick off the lowest card and advance out through the throat and into the bite of the first set of feeding rollers 174—177.

The throat is the narrow opening through which only one card may pass at the same time. This opening is defined by adjustable plate 56 already mentioned and a roller 279 with its center in alignment with the inner wall defined by plate 56. Plate 56 is fastened to a cross bar 280 which is independent of the front wall member 55 and is made removable, so that if any cards become jammed at the throat the throat plate and bar 280 are easily taken out of the way by removing screws through the stationary side frames 26 and 27.

Roller 279 (Fig. 6*a*) which defines the bottom side of the throat is pivoted in a plate 281 which is guided by a pair of ribs 282 on the top face of the magazine casting 236 and is secured thereon adjustably by the screw slot connection 283.

An upper card guide 285 (Fig. 6*a*) is provided in association with the first upper feed rollers 176 and 177 encountered by the record card as it leaves the magazine. This card guide is formed with an upper vertical portion which is secured to the throat bar 280. Guide 285 is cut out to provide room for the upper feed rollers, and it curves downward in the path the record must take in going from an angle of inclination of 20° down to the horizontal path extending across the sensing mechanism.

Another card guide 286 is provided to define the lower portion of the curve card path between a magazine and first sensing station. This guide 286 is cut out around the lower feed rollers 174 and 175 and has a vertical section which is attached to the wall 287 forming part of the main magazine casting 236.

Referring to the sectional view (Fig. 7), it is seen that magazine casting 236 is formed with a vertical opening 289 through which there extends upwardly a sensing member 290 (Fig. 7*a*) for sensing the presence and absence of record cards in the magazine. This sensing member 290 is in the form of a finger or angular lever which is secured to a short horizontal shaft 291 extending through circular openings in the walls of the casting. The shaft is held in position by a set screw 292, the end of which projects into a notch 293 formed in the shaft. Attached to the outer end of shaft 291 is an arm 294 with an off-set portion 295 poised over an insulation plate on the top contact of a pair of contacts 296 fastened to the underside of one of the formations in casting 236. The arrangement is such that as long as one or more cards remain in the magazine the sensing lever 290 will be depressed, rocking shaft 291 (Fig. 7*a*) in a counterclockwise direction and depressing arm 294 to close contacts 296. Whenever the last card passes out of the magazine, the upper blade of the contacts 296 is resilient enough to lift the connections, so that feeler 290 projects upward and the contacts 296 are allowed to open.

Another card feeler arrangement or card lever is provided in the shape of a long lever 298 fastened to shaft 299 and provided with an upper shoe 300 projecting through an opening in the lower card guide 286. Lever 298 is normally held with the shoe 300 retracted downward out of the card path. However, whenever the machine is in a running condition, a cam 250 on the clutch spool 140 operates to allow counterclockwise motion of lever 298, and then it projects upward through guide 286 unless held down by a card in passage between the magazine and the first sensing station. Shaft 299 extends outside the left frame 27 (Fig. 2) and carries an arm 251 for holding a pair of contacts 252 in a closed condition. Whenever the lever fails to sense the presence of a card during running condition, it operates the pair of contacts 252 to open them for the purpose of stopping the machine.

*The card stops*

Associated with each sensing station is a card stop or gate mechanism for stopping the card in position to be analyzed by the sensing pins. There are two such gate mechanisms; one for station U and the other for station L. They are similar in construction and operation so that the description applied to the first gate mechanism associated with station U also applies to the other stopping mechanism as station L, the difference between the two being pointed out in Figs. 6 and 6*a*, where the first cross bar or gate member is designated 310 and the second stop is designated 311.

The two gate mechanisms are self-contained, being mounted in separate castings 312 and 313. These castings fit between the main side frames 26 and 27 and are fastened thereto and act as a sort of basket to hold the studs and shafts for operating the gates 310 and 311 to lift and lower them at proper times to stop and release the cards. These castings also serve to support plates 315 and 316 upon which the card rests as it is being analyzed in two sensing stations. Reference to Fig. 6*a* shows that plate 315 is situated in sensing station U and is perforated with a complete set of circular openings to underlie all pin positions in the index positions of the card in the three decks. The plate is enlarged at 317 to provide for an extra column of perforations which are outside the area of the regular index points mentioned hereinbefore with reference to the card. These extra pin positions at 317 are provided merely for detection of the presence or absence of the card and the card is never perforated in such position. The other plate 316 is similarly constructed with an extension 318 with a set of extra sensing positions for control purposes only.

Turning now to consideration of the construction of the first casting 312 and the mechanism hung thereon which is similar to that at the second station, it is noted that the section through the casting (Fig. 6*a*) includes a cross bar 320 and an elongated U-shaped section 321. When observed from the other direction in the end sectional view (Fig. 12), it is noted that intermediate the main side frames the casting 312 is formed with an inverted elongated U-shaped section 324 from which there rises three webs 324, 325 and 326. These webs are cut out to allow room for the lower feed roller shafts 190 and 193, but they are elevated in other positions to lie directly under the guide plates 315 for supporting the card in the sensing position.

Referring to Figs. 6 and 6*a*, it is noted that the casting is formed with a pair of forwardly extending ears 329 which serve as bearings for bolts 330 which are pivots for a pair of arms 331 that carry the cross bar or gate 310. In Fig. 9, it is seen that the gate 310 extends across most of the sensing unit and at its ends is formed with a pair of bent sections at right angles to the elongated portion, Fig. 6*a*, said ends not only being formed with a pivot 334 but also extending downwardly as an arm 335, the lower end of which is articulated at 336 and the end of an operating arm 337 fastened to a shaft 338. In the side view it is noted that the construction is such as to lift and lower the gate 310 in an almost vertical path. The parallel linkage is arranged to cause such movement because the fixed centers 330 and 338 are on opposite sides and almost directly in line with the two movable centers 334 and 336. A spring 340 which is drawn between arm 337 and a cotter pin fastened to the support casting tends to rock the arm 337 in a clockwise direction with shaft 338. This tendency is also communicated through pivot 336 to the lower extension 235 of the gate 310 which is further guided by the loose pivot 334 on the end of arm 331 pivoted at 330. The control for lowering the gate is exercised by a cam operated arm 342, best shown in Fig. 6*a*, where it is seen to have a roller 343 for resting on the gate operating cam 141 already mentioned as being on one of the clutch spools which is magnet-controlled.

For further clarification of the construction for operating the front gate, in Fig. 12 it is noted that the operating shaft 338 extends across casting 312 and is carried by downwardly facing portions of the inverted U section 323. The shaft is held in position by a pair of collars 345 and 346 and near the ends of the shaft are secured the lifting arms 337 for carrying the two ends of the gate. Near the left end of the shaft 338 is fastened the operating arm 342 with the roller 343 resting on the operating cam 141. The cam 141 is so designed that early in each cycle the gate is allowed to rise, as urged by springs 340, and thereby go back as a stop for engaging a forward edge of the moving card to hold it in the position to be sensed. After the sensing operation is completed, a rise on cam 141 cooperates with roller 343 and rocks arm 342 (Fig. 6*a*) in a counterclockwise direction to depress both support linkages 331 and 337 and thereby lower the gate 310 against the pressure of the springs 340. The card is then allowed to escape as driven by the skid rollers and continue over to the second sensing station where a similar mechanism for controlling the gate 311 is timed to first hold and then release the record after sensing operations.

Since the gate operating mechanism is controlled by a magnetic clutch, it is believed well at this point to consider the mode of operation of such a clutch. As noted hereinbefore, with reference to Fig. 3, it was explained that four clutches are provided to control the operation of the two gates and to control the operation of the two pin lifting and lowering mechanisms. The clutch spools 140 and 125 are related to the front and rear gate mechanisms, respectively, while the spools 153 and 156 are related to the front and rear pin lifting mechanisms, respectively.

Since the magnetic clutch mechanisms are similar in construction and operation, it is believed sufficient to describe the one associated with the front gate mechanism and such description is understood to apply to the other three clutch controls, said controls being differentiated by the designation of the control magnets, the designations of the control magnets for the front and rear gate mechanisms being designated as controlled by magnets FG and RG, respectively, and the other two pin lifting control clutches being differentiated by designations applied to the magnets FP and RP applied to the controls for the front and rear pin lifting devices, respectively.

For a detailed understanding of the clutch mechanism reference may be made to Figs. 3, 6*b* and 11.

In Fig. 6*b* it is seen that attached to the slanted cross bar 33 is a clutch mechanism frame 350 formed with a pair of side walls 351 and 352 between which there is supported a shaft 353 in bearings in the two side walls. This shaft 353 carries the tripping and restoring elements of the clutch. Extending from the side wall 352 is a web 355 to which is secured the L-shaped magnet frame 356 carrying the magnet FP. Also projecting from wall 352 is a stud 357 which acts as the pivot for an armature lever 358 extending upwardly alongside the magnet FG to be influenced when the magnet is energized and deenergized.

Alongside the armature is a stop member 359 provided to limit its movement in the deenergized position. The top end of armature 358 is in the path of a shouldered extension 360 on the end of a tripping lever 316, which is pivoted on shaft 353 and provided at its front end with a hook 362 normally engaging the short extension on a clutch pawl 363 which is pivoted at 364 on a plate 365 attached to the clutch spool 140. Plate 365 is formed with a spring stud extension 366 from which there extends a spring 367 attached to the end of pawl 363 and tending to rock the pawl into engagement with a single toothed drive disk 368 attached to shaft 112. Since the pawl 363 is normally held out of engagement by lever 361, shaft 112 normally rotates without carrying the clutch spool along therewith. However, when magnet FG is energized armature 358 is rocked clockwise to be disengaged from the shouldered end 360 of lever 361; thus permitting the lever to rock in a clockwise direction about shaft 353 as it is urged by spring 370. The hook 362 then releases pawl 363, so that it may be rocked counterclockwise by spring 367 and drawn into engagement with the single toothed disk 268 and thereby connect the clutch spool 140 to the shaft 112 so that it is carried around thereby with the cams for a single revolution.

Means are provided for limiting the rotation for a single revolution. Pivotally mounted on shaft 353 are a pair of arms, the one numbered 373 being placed alongside the release lever 361 and having an off-set extension 374 overlying the top of lever 361 to influence its movement in a downward restoring movement. The other arm mounted on shaft 353 is the downwardly extending bar 375 carrying a roller 376 in engagement with a restoring cam 377 which serves to rock arm 375 in a counterclockwise direction about pivot 353, so that a spring 379 attached thereto pulls down the arm 373 which, through the overlying off-set connection 374, exerts a similar downward movement to the clutch lever 361 so that the hook 362 thereon is in the path of the short extension on pawl 363 to stop it at the end of a cycle. Arm 373 is so proportioned that its end confines the projection 380 formed on plate 365 in conformity with the short extension on pawl 363. When the clutch spool arrives in the stopping position as determined by the hook 362, the end of arm 373 snaps down behind extension 380 and prevents rebound.

Lever 375 is held in cooperation with cam 377 by a light spring 382 which is connected to a short arm 383 extending therefrom. This spring 382 is to be differentiated from the stronger spring 379 which is normally relaxed and is stretched in a positive manner to effect declutching action.

Associated with the ends of the armature 358 and the shouldered portion 360 of the clutch lever 361 is a small bell crank 385 which serves to rock in a clockwise direction to disengage the armature in a positive manner from the magnet holes from the time the clutch lever is restored to the home position. This is done to insure the proper latching position of the armature and to overcome any residual magnetism tending to hold it in operating condition.

Before describing the parts on the hinged liftable frame, there are a number of other fixed parts in the lower stationary frames which are of interest in guiding the card.

It will be noted in Figs. 10 and 11 that a long card guide rail 390 is provided near, and attached to, the right side frame 26. It is toward this rail that the upper skid rollers 226 are tilted to direct the card to ride along with its right side edge in a groove cut along the rail.

*The liftable sensing frame*

It is noted early in this description that pivotally mounted on pins 40 (Fig. 5) projecting from the main side frames 26 and 27 there are arms 38 and 39 carrying the entire upper sensing structure as a hinged unit. Reference to the side view (Fig. 2) reveals that arms 38 and 39 do not extend forward very far, but have insulated connections with a pair of plates such as plate 50, to which is secured the large basket frame or main swinging casting 395 in which all sensing and analyzing parts are suspended. Plate 50 is secured to arm 39 by rivets 46 and frame 395 is hung on the same plate by large bolts 396. At the other side the frame is secured to arm 38 in a similar fashion by plate 49.

Frame 395 (Fig. 12) contains six sets of pins 398, each set comprising 60 columns with seven pins in a column to analyze the six decks of perforations in two cards at the U and L stations. The pins are arranged in separate groups at the two stations (Figs. 6 and 6*a*) and the holders for them are lowered and lifted separately to project them through the cards intermittently between card movements. Frame 395 also contains seven sets of contact levers or bell cranks 400 which ride over the heads 397 of pins 398 to detect lowered pins in perforations and thus close contacts to emit impulses representative of the perforations. There are three sets of cranks 400 at station U with 60 cranks in each set, and each cooperating with the heads of a column of seven related pins. There are four sets of cranks at station L with 60 cranks in each set, the two outer sets of cranks cooperate with but one related set of pins, but the two inner sets of cranks cooperate with two related sets of pins to supplement the impulse initiation with "late 5" readings for accumulation. Frame 395 also holds seven sets of contact strips 407, there being one strip for each crank to carry the electrical impulse which is timed by the crank swinging against it.

In deck B at station U and L there is an extra column of pins, an extra crank and contact strip to cooperate with an imperforate margin of the cards for presence detection.

Before going into detail regarding the construction and operation of the pin, crank and strip elements of the sensing unit, it is believed best to examine the shape of the swinging frame 395 and how it is adapted to hold such a plurality of elements with diverse movements.

Frame 395 has two side walls 410 and 411 (Fig. 11) which extend from a position near the magazine M to the stacker drum SD (Fig. 9). Tying the walls together are three U-shaped sections (Fig. 6*a*), an end section 413, a central section 414, and the other end section 415 (Fig. 6). Between the sections are two openings through which the sets of pins reach down to the two cards at the two stations.

Fastened to the tops of the sections are four cam plates 416, 417, 418 and 419, upon which the end cranks 400 ride as they pass beyond related sets of pin heads.

Fastened to the bottom of frame 395 are two thick plates 421 and 422, the former having three elongated openings for the pins at station U and the latter cut out for the pins at station L. Plate 421 has attached to its upper face a thin metal sheet 423 with a complete set of round holes to guide all the pins at station U. Attached to the lower face of plate 421 is a thin card guide sheet 424 which is flared upward near magazine guide 285 and extends back to a similar flared sheet 425 which is affixed to plate 422 at station L. Both sheets 424 and 425 are cut with a full set of openings through which the pointed ends 399 of pins 398 may pass freely to engage the card surface. The sheets are primarily card top guides and do not guide the pins. To the top of plate 422 is attached a sheet 426 with a complete set of guide holes for the pins at station L.

Referring to Fig. 12, it is seen that a pair of cylindrical sleeves 428 are riveted at the sides to the underside of plate 421 and extend downward to carry the pair of plungers or lifting rods 429 which are used to lift and lower the pins 398. Each rod 429 is shaped with a spaced shoulder 430 on which is fastened the lifting plate 431, which has three elongated openings for the three sets of pins at station U. Lifting plate 431 extends over both pins 398 and is carried thereby to be lowered and lifted, so that the pins 398, the heads 397 of which rest on a thin sheet 433 fastened to the top thereof, are dropped into and lifted out of the card perforations.

The sectional view shows that the lower end of rod 429 is bored to receive an insulation bushing 435 which is secured thereto by a pin 436 extending through the walls of the pin and the central section of the bushing. This pin 436 extends on both sides and acts as a stop for a spring retainer collar 437 upon which there presses the lower end of a compression spring 438, the upper end of which presses against the lower part of a sleeve 428. A metallic wear plate 440 is attached to the lower part of bushing 435, and it is this button which rests upon an operating roller 441 on the end of an operating arm 442 attached to the shaft 443, which is pivotally mounted on the main side frames. Spring 438 tends to depress the rod or plunger 429 and hold it down against the operating mechanism at all times. In the normal position of the parts the rods are raised to carry the plate 431 and the pins held thereby in an elevated position. Since the pins and the cooperating cranks are to be part of the electrical circuit for initiating impulses, the entire frame must be insulated from the supporting and operating portions of the machine and that is the reason for the provision of the insulation bushings 435 and the insulation plates for electrically separating the main frame 395 from the swinging arms, which are pivoted on the main side frames.

At the right side of Fig. 12, it is seen that the other plunger for rod 429 extending below the right side of the lifting plate 431 cooperates with a roller 445 on an arm 446 also attached to shaft 443. Arms 442 and 446 are, therefore, connected by a shaft 443 and operate together to lift and lower the two rods 429, so that the pin holding plate 431 is lowered and raised in unison at both sides. Alignment is assured because of the guiding effect exercised by the long cylindrical supports 428 through which the rods 429 oscillate.

Fastened near the midpoint of shaft 443 is a third arm 448 which is the operating member carrying a roller 449 in cooperation with the control cam 154 (Fig. 3), which is previously mentioned as being on the clutch spool 153 for the controls over pin lifting devices at the front U station. The contour of cam 154 is such as to hold the pins elevated until a record is at rest in position at station U and then a depression in the cam allows roller 449 to be lowered, carrying the two arms 442 and 446 along therewith in a clockwise direction so that the two rods and the entire set of pins at station U are allowed to descend as urged by springs 438. The pointed ends of the pins then either rest on the top surface of the record card (Fig. 14) or project downwardly through perforations therein (Fig. 15), and it is this gravitational disposition of the pins which determines the delivery of impulses as effected by the cranks so cooperating with the heads of the pins as to be rocked in and out of contact.

The actual timing of the pin lifting cam 154 is better observed in connection with the timing chart which is to be considered near the end of this specification. The same regard for exact timing of other cams and timing expedients is also considered in greater detail and with more definite regard for timing with relation to the chart discussed hereinafter.

Although the movement of the pins at the first station U was the subject of the preceding section of the description, there is a similar arrangement at station L differing mainly in the operating connections. In Fig. 6, it is noted that at station L there is supported above the sheet 426 a lifting plate 451 similar to the other lifting plate 431. This plate 451 carries a thin perforated sheet 452 upon which rests the edges of all the pns in station L and the sheet is perforated to act as a top guide for the pin. Attached to plate 451 are two rods or plungers 453 extending down through guide cylinders 454 attached to plate 422, said rods and cylinders being similar in construction and operation to the related parts 428 and 429 at station U.

The operating mechanism for the pin lifting devices at station L is somewhat different from those at station U because the drive connections are established through a length of large tubing 456 which encircles a large shaft 457 used to oscillate the crank holding frame. Secured to the middle of the tube (Figs. 3 and 12) is an operating arm 458 carrying a roller 459 resting on the cam 157 which is noted in Fig. 3 to be part of the clutch spool 156 already mentioned as part of the assembly for controlling the pin lifting devices at the rear or L station. The timing of cam 157 is noted in the timing chart (Fig. 18) to be somewhat similar to that of cam 154 for operating the pins at the other station. The operating movement is communicated through the tube 456 to an operating arm 461 fastened on the right end of the tube and another operating arm 462 fastened on the left end of the tube. These two arms 461 and 462 carry rollers 463 cooperating with the lower ends of the two rods 453 extending below the pin lifting plate 451. The action for lowering and raising the pins at station L is the same as that described for station U, since cam 157 is shaped to permit counterclockwise rocking of the two arms to permit lowering of the rod and pin holding plate after a card has been positioned in station L. At the proper time the entire assembly of pins is elevated to permit further advancement of the record into the stacker.

*Contact crank shifting mechanism*

Before pointing out the means for moving the cranks 400 horizontally to emit timed impulses under control of the depressed pins, it is believed best to consider the different positions of the contact making elements, as shown in the enlarged views (Figs. 13, 14 and 15), showing the parts first with the pins 398 in the fully retracted or upper position and then in the position which allows the pins to pass through the perforations and thirdly in a position with the bell cranks moved horizontally over lowered pins.

In Fig. 13, the crank 400 is shown in the normal position related to the associated seven pins 398, which are elevated, and it is noted that the first pin at the left acts on a cam end 402 of the crank to rock it clockwise about pivot 401, so that the contact button 404 is depressed and out of contact with the strip 407.

When the pins 398 are lowered into contact with the card, should the card be imperforate in all positions, then the heads of the pins stand as shown by the first two pins in Fig. 14 and the crank, although it rocks slightly in a counterclockwise direction, still fails with respect to those two pins to swing sufficiently to put button 404 in contact with the lower edge of contact strip 407.

It is only when one or more of the pins 398 project through a perforation (Fig. 15) that the head 397 thereof is lowered sufficiently to allow crank 400 to rock in the counterclockwise direction to establish contact with the contact strip. It is not only with the first pin directly under the cam portion 402 that the contact arrangement is concerned, but all seven pins are to be sensed successively and differentially timed impulses caused thereby to control mechanism for adding, etc. For this reason the crank 400 is drawn horizontally toward the right, so that the cam portion 402 is drawn across the heads of the pins from left to right successively. Whenever a depressed pin is encountered by the cam end of the crank, the other end with button 404 is lifted sufficiently to contact momentarily with the underside of contact strip 407 and establish a circuit which is momentarily held should only one pin be depressed, and contact with strip 407 is maintained and impulsing is repeated if the next pin is depressed. The circuit breakers CF34 and CF35, Fig. 19*a*, are in series with the sensing levers and serve to properly time the separate impulses. In this way, any one of seven possible impulses may be delivered for any combination or arrangement of such seven possible impulses as the crank is moved to the right with a uniform motion. The following section of the description is concerned with the means for mounting and shifting the cranks, so that they are adapted to ride over the pins and emit impulses representative of the pin positions as determined by perforations in the record.

All seven sets or rows of cranks 400 are mounted in a common frame for movement in unison over and back across the heads of the pins, there being 60 of said cranks in each row with the exception of two extra cranks cooperating with the pins in the two B decks as shown by the extra set of openings 317 and 318 (Fig. 8).

Reference to Figs. 11 and 12 shows that the crank holding frame has a pair of side bars 465 and 466 in L-shaped formation. Extending across the machine between these two bars are seven comb bars 467 (Fig. 6*a*), each one holding a row of cranks and secured to the top of the horizontal legs of the side bars 465 and 466 by screws 468. Thus, the combs 467 not only act as supports for the magnets but they also serve as connecting means and stiffeners for the entire frame which is to be oscillated to give the cranks the necessary movement over the pins.

Since all the comb bars 467 are similar in construction, this description of one applies to the other six. Referring to the end view of Fig. 12, it is seen that the end portions of combs 467 are reduced at the points where screws 468 secure the comb to the end bars 465 and 466. The midsection is of substantial height to provide stock for several cutting and drilling operations to provide room for the lower parts of cranks 400. As shown in the enlarged views (Figs. 13, 14 and 15), the comb 467 is cut with notches or slots 470, so that each crank 400 has an individual guide around the pivot 401. This pivot 401 is a wire or rod which is extended through circular openings formed in all of the comb teeth 470.

Directed upwardly into the comb bar 467 is a full set of circular openings for receiving small compression springs 471, which press against the horizontal arm of crank 400 and tend to rock it in a counterclockwise direction so that the cam end 402 is directed towards cooperation with the heads of the pins. The horizontal crank arms are guided at the other end by means of a supplemental comb plate 472 which is fastened to the underside of comb bar 467 and formed with teeth which loosely embrace the cam portion of the lever. Extending upwardly from the comb bar is a projection 473 with a front vertical wall which cooperates with a flat face 474 formed at the bend of the upper arm of crank 400 to limit the counterclockwise movement of the cranks, when they are being assembled. It may be noted that the contact button 404 on the end of the upper arm is formed with an arcuate upper surface to establish line contact with the lower edge of the contact strip.

Now that the details of construction of the crank holder have been considered, the next step is to point out how the frame is mounted for horizontal oscillating movement.

The section (Fig. 11) shows that a bolt 477 is passed horizontally through the vertical wall of frame bar 466 and it carries a roller 479. There are four such rollers 479 (Fig. 9), one at each corner of the crank holding frame. The two roller pivot bolts 478 on the right bar 465 are slightly longer than those on the other side, because they carry not only rollers 479 but also carry semicircular keying blocks 480 which extend upward above the right hand rollers to key the crank frame to the large frame 365.

In Fig. 11, it is seen that four rails 482, 483, 484 and 485 are secured to, and extend inwardly from, the walls 410 and 411 of the large frame 395. It is between these rails that the rollers 479 oscillate horizontally to carry the crank holding frame back and forth. The two lower rails 482 and 484 are shouldered to confine the rollers laterally and there is a further guiding effect exercised by a long groove 486 cut into the underside of top rail 483 and into which the keying blocks 480 project.

Provisions are made to communicate the oscillating movement from the upper ends of two vertical arms to the two sides of the crank holding frames. Referring to the sectional view (Fig. 9), it is noted that bolted to the outside of both side bars 465 and 466 are extending yokes 488 and 489, the former being secured to the right hand angle bar 465 by bolts 490 and the other yoke 489 being secured to the left bar 466 by bolts 491. In the plan view (Fig. 8) it is seen that both the yokes 488 and 489 are shaped like a U with the arms extending outward from the crank holding frame. In the elevational view (Fig. 2), it is noted that the side arms of the yokes are flared outward in the lower portions 492, so that when the sensing unit frame is lowered the crank carriage tends to centralize itself over the rollers on the oscillating arms. Extending inwardly from the side arms of the yokes 488 and 489 are the heads of pairs of fiber buttons 493 provided to cooperate with both sides of the operating roller and to provide insulation for further separating the sensing frame electrically from the body of the machine. The buttons 493 on the yokes extend beyond the two main side frames, where they are available for engagement with the vertical operating arms which are about to be described.

The end sectional view (Fig. 11) shows that the large shaft 457 already mentioned as carrying the tube 456 extends through bearings in the two main side frames and at the right end carries a large vertical arm 495, the upper end of which carries a roller 496 in engagement with the yoke 488 extending from the right side of the crank holding frame. A similar arm 497 is fastened to the left end of shaft 457, and at its upper end it carries a roller 498 in engagement with the yoke 489 extending from the left side of the crank holding frame. A pair of shields 499 and 500 are fastened to the right and left walls, respectively, of the main sensing frame and extend downwardly to enclose the roller and yoke devices, so that they are shielded from the fingers of the machine operator.

The oscillating frame comprising shaft 457 and the two arms 495 and 497 are operated by the complementary cams 162 and 163 shown in the plan view (Fig. 3) and previously mentioned as connected to the main driving gear 111. However, the camming action is not communicated directly to the oscillating frame but is connected through an adjustable operating lever variably set with relation to the right hand arm 495. This adjustable lever 502 is loosely pivoted on a hub extending from the arm 495 and is formed with a pair of arms, the upper arm carrying a roller 503 cooperating with the outer cam 162 and the lower arm carrying a roller 504 cooperating with the inner cam 163. The lever 502 is formed with a third extension formed with a slot 505 which is at an angle slightly off a radial line with respect to the center of shaft 457. Adjacent slot 505 there is a somewhat similar formation 506 in the arm 495, the difference being that the slot in arm 495 is also out of radial alignment and at a different direction than the direction of angularity of the slot 505. Extending through the two slots 505 and 506 is an adjustment and fastening bolt 507, the head of which is a flat rectangular extension 508 bridging across slot 505 and terminating in the end, which is slightly enlarged to pass through slot 505 and stop short of passage through slot 506, which is penetrated by a portion of the bolt 507 of a smaller circular area. Since the bolt 507 is adjustable vertically to extend through the two slots in any one of an infinite number of upper and lower positions, it will be realized that lever 502 is adjustable radially with respect to arm 495. When the proper adjustment is arrived at, the nut on the outside of bolt 507 may be tightened to clamp it in the desired position along slot 506 and there it projects through slot 505 to hold the follower lever 502 in the proper relationship. As a further securing means a bolt 509 is threaded in lever 502 and passes through an arcuate slot 510 cut in a short lower extension of arm 495. Bolt 509 is loosened when adjustment is being made and then is tightened to clamp the arm lever together in cooperating relationship.

As a further means for adjusting the oscillating movement of the oscillating operator for the crank frame, there is provided an adjustable clamping device between the two cams 162 and 163 and the gear 111, similar to the adjusting devices between levers 495 and 502.

In the sectional view (Fig. 10) it is seen that the two cams are connected by a hub 520 which is loosely mounted on the hub of the main driving gear 111 which is pinned directly to shaft 112. The cams are connected to gear 111 by an adjustment bolt 517 which passes through slots 515 and 516 cut in cam 162 and gear 111, respectively. These slots 515 and 516 are not only of angularity differing from radial displacement but also different with respect to each other, so as to produce relative circular movement between the gear and cams when the bolt is shifted vertically. The bolt has an inner rectangular head 518 terminating a larger sectional area passing through slot 515 than the outer end area passing through slot 516. A washer is placed under head 518 and, when the nut is tightened, the gear and cams are fixed in the adjustable position. A further clamping action is exercised by a bolt 519 which passes through an arcuate slot in gear 111 and is threaded in cam 162 to tie the driving means together.

It will be noted that the bell crank sensing lever shifting mechanism is independent of clutch operation and is operated invariably as long as the card feeding and sensing unit is being driven. Of course, there are other electrical controls for deciding when the impulses created by such oscillating movement of the levers are to be directed into the mechanism to be controlled. Therefore, even though the cranks operate continuously that is no indication that the contacts established thereby are effective to generate control impulses at all times.

The cams for oscillating the crank holding frame are proportioned to advance the seven rows of cranks 400 from left to right after the pins have dropped through perforations in the record. This movement is synchronized with accumulating or other accounting control devices and the impulses derived from the rocking movements of the cranks have value directly associated with the time of generation which in turn is controlled by the movement of cams 162 and 163. The timing of the cams and the generation of the impulses is brought out clearly with reference to the timing chart (Fig. 18) which not only shows the relative position of each impulsing cycle but also the relationship between said impulses and the other operating controls for accumulating action.

*The contact strips*

It is noted with respect to Figs. 6, 6*a* and 11 that associated with each contact making crank 400 is a horizontal contact strip 407 which is poised above the button 404 on the end of the top arm of the crank to be contacted whenever the crank rocks counterclockwise, while passing over a depressed pin. Since there is such a strip 407 for each crank, there are six rows of such strips with 60 strips in each row and two extra strips for the B deck rows having an extra sensing column position as already noted.

The sets of strips in the two different stations U and L are separated in two sets of three rows each with the related sets of three fastened to common insulation sheets 522 which are assembled in a compact formation as about to be described with reference to Fig. 6*a*.

Two separate holders are provided, one to removably contain the contact strips 407 for station U, and the other for the strips at station L. Because they are identical in construction, a description of one applies as well to the other. Although the holders are said to carry the contact strips 407, there is no metallic connection between any of the strips 407 and the holder, and really it is the insulation sheets 409 which are fastened in the holder to suspend the strips 407 separately above the cranks 400. Each sheet 409 has fastened on one side by cycle welding or any space saving mode of connection a set of three contact strips 407, said strips being separated and having their lower edges projecting below the bottom edge of the sheet. Thus, the bottom straight horizontal edges of strips 407 are separately exposed and each is available for contact by a button 404 on the top of a crank 400.

Extending upwardly from strips 407 are the contact prongs 408 which are crimped at 523 with ridges to receive and hold clips on the ends of separate wires leading to the plugboard of the machine. These prongs 408 are not only separated by the sheets 409 but they are also staggered in formation to allow more room for attaching and removing the top plugging clips.

Sheets 409 are formed with two end extensions 522 and 524 and the strips are located, supported and held by combs and bars cooperating with said extensions as about to be noted.

Fastened across the top of the main frame 395 (Figs. 6 and 8) by bolts 526 screwed in the side walls 410 and 411 is a pair of rectangular hollow frames 527 and 528, the former as the holder for the contact strips at station U and the latter being for the same purpose at station L. The walls of frame 527 are of an L-shaped cross section with the lower leg of the L facing outward at the sides (Fig. 11) and inward at the two ends (Fig. 6*a*).

Fastened under the two ends by sets of four screws 529 are two comb bars 530 and 531 with teeth for separating the end extensions 522 and 524, respectively, of the insulation sheets 409. Attached under bars 530 and 531 are support bars 532 and 533, which extend to underly the extensions 522 and 524 and confine them below the ledge of frame 527.

As a further locater and stiffener for the mid-section of the sheets 409 there is attached to ears 535 extending inwardly from frame 527, a comb bar 536 with downwardly pointing teeth 537 between which fit the upper edges of sheets 409.

It is noted from the foregoing that the insulation sheets 409 and the contact strips 407 thereon are held individually and fastened to hold them rigidly in place with respect to movement in all directions.

Since the stacker may be rocked away from the top of the sensing unit, the upper ends 408 of the contact strips 407 are readily available for the attachment of terminal plug wire connections and also for removal of the strips for inspection of the lower edges of the contact strips, whenever necessary. Because the entire sensing unit assembly is built on a unit basis, it is possible to separately remove and inspect the contact strips, the crank holder and the pin holder in the order mentioned.

*Assembly interlock*

In order to insure that the swinging sensing unit frame and the swinging stacker frame are located in the proper position, an interlock is provided including the wing-shaped arms 91 and 92 previously mentioned as extending from the two sides of the side frame and rockable thereon to shift the two bolts 93 and 94 with respect to the swinging frame. Reference to Fig. 8 shows, in greater detail, the manner in which the openings 95 and 96 are provided in the side walls 412 and 411 of the main swinging frame. There it is noted that not only are hardened bushings 539 provided but these bushings are separated from the casting carrying them by similarly shaped insulation bushings 540, which insure that the sensing frame is electrically insulated from the remainder of the machine. The hardened bushings 539 are formed with sharp corners opposite the sliding plungers 93 and 94, so that they cannot be inserted therein until the swinging frame is lowered against the insulation stop bar 541 which not only electrically insulates the frame but also marks the home position of it. In order to bring the swinging frame down from the lifted position, the arms 91 and 92 must be rocked into the erect counterclockwise position, Fig. 2, and it is only when the frame is fully restored that they are able to project the plungers into the side openings and thereby swing to the angular restored clockwise position, wherein they are out of the path of the descending offset portions extending from the bottom of the stacker frame.

*The circuit breakers and cam contacts*

In addition to the hopper contacts, card lever contacts and other mechanically controlled contacts, there are provided two sets of circuit breaking and cam contact arrangements operated automatically directly by the driving mechanism of the machine. Referring to Fig. 3 showing the driving mechanism diagrammatically, it is noted that there is a set of three circuit breaking cams 118, 119 and 120 on the shaft 117, which is geared directly to the drive gear 111 and constantly rotating. These cams and contacts associated therewith are operated continuously as long as the machine is in operation and regardless of whether the cards are feeding. Other similar cam contact constructions are provided on shaft 150, but these cams are driven through the clutch spool 140 as already noted, so that they are effective only when the first gate clutch is operated to control movement of the picker and the first gate to control movement of a card through the sensing unit. A description of the cams on shaft 150 and the contact devices associated therewith applies as well to the cams and contacts on shaft 117 for the constructions are alike.

Referring to Fig. 6*a*, it is noted that a series of cams 544 are variably set and clamped on shaft 150. Adjustably mounted on each cam 544 is a secondary cam 545 for controlling the same contact of the related main cam 544. The first cam 544 serves to close the contacts and the other cam 545 trips a latching mechanism at the desired time to permit the contacts to open.

The several contacts are separably held in frames 546 which are clamped in position at their lower ends by means of square projections 547 inserted in a similarly shaped groove extending along the bar 35. Attached to and insulated from the front of frame 546 is a pair of contacts 548, the inner blade of which is lengthened to cooperate with an insulation button 549 on a plunger which extends through frame 546 and has a pointed end 550 resting on the cam 544. Whenever a high point on the cam strikes the point 550, the plunger is driven into the frame 546 and button 549 closes contacts 548. At the same time a shoulder 551 on the point 550 is moved past a latching extension 552 on a swinging latch 553 pivoted at 554 on the frame 546. The latch is formed with an extending cam follower projection 555 which cooperates with the secondary cam 545 so that, when the extending point on the cam strikes point 555, the latch is rocked in a clockwise direction to release the point 550 and allow the contacts 548 to re-open as urged by the tension in the contact blade.

It is evident from the foregoing that any desired timing of the contact closure may be selected by adjusting the setting of the two cams 544 and 545, relative to the making and breaking mechanical cam point 555.

*The stacker mechanism*

As a card leaves the second station L (Fig. 6), it passes out from between the two plates 316 and 425 and is guided upward beyond the last feed rollers by a slanted and upwardly curved guide plate 559, which is fastened between the side frames 26 and 27. The left curved end of guide 559 is curved to conform with the periphery of the stacker drum SD and by this means the card is advanced to the drum and partly around it.

It is noted hereinbefore that the stacker drum shaft 63 (Fig. 3) is driven by gearing including gears 126, 127, 129, 130, 131 and 134, so that the drum is turned clockwise a half revolution every time the rear gate clutch is tripped.

The stacker drum SD is made up of three sections, a right end section 560, a center joining section 561, and a left end section 562, all said sections being fastened together and on shaft 63.

Passing through the drum SD near the periphery and at 180° spacings are two sliding rods 563 in bearings in the wide walls of the end sections. These rods 563 carry four card clip frames 564, there being two such frames 564 spaced near the ends of the two rods, said frames projecting through four openings 565 in the drum to grasp the card.

Since all four clip frames 564 are similar in construction and operation, a description of one applies to the other three. Each frame is of triangular shape with one corner 566 encircling the slide rod 563, the second corner being notched at 567 to slidably engage the drive shaft 63, and the third corner being formed as a pad 568 on which a card edge is held by the pinching action of a pair of thin curved blades 569 extending from a rockable arm 570 fastened to rod 563 between the two end arms 566 (Fig. 9) of the frame. An attached clamp 573 holds the blades 569 attached to arm 570 and extending rearwardly therefrom. A spring 574 tends to press the blades on pad 568 at all times. Each rod 563 is operated to rock and swing the tips of blades 569 against pad 568 with the front edge of the card between them. For this purpose, to the right end of rod 563 (Fig. 9*a*) is attached an arm 571 bearing a stud on which is a roller 572.

The two rollers 572 are so supported by arms 571 that they project inwardly and ride around a pair of cam bushings 577 and 578 which are adjustably secured near the right end of shaft 63 just inside the frame member 65 upon which the swinging stacker frame is secured. These cams 577 and 578 are shaped to hold the rods 563 in such a position as to rock arms 571 so that the spring blades 569 extending from the arm 570 thereon normally grasps or pinches the record card to the drum. However, there are two positions wherein two high points on the cam surface rock the arms 571 and rods 563 in a clockwise direction (Fig. 6) to open a space between blades 569 and pad 568. One of the two positions wherein the parts are separated for allowing the card edge to project therebetween is shown in Fig. 6 and it is in this position that a card coming out of the last sensing station L is projected beyond guide 559 and into the position wherein blades 569 are allowed to swing counterclockwise as urged by spring 574 so as to engage the card between blades and the pad 568. Since there are two arms 570 on each rod 563 and said arms each containing two blades 569, it is evident that the card is clamped to the stacker drum by four of the blades and is carried thereby in this position which is maintained for more than 180° as the stacker drum rotates in a clockwise direction to bring the card over to the almost vertical position in front of the retaining frame 71. At the stacking position the bottom plate 73 of the card holder projects into the annular opening 579 in the central section 561, and is, therefore, in the path of the leading edge of the card as it is being pulled around on the stacker, and engagement with the top of plate 73 serves to disengage the card from the stacker and deposit it in the hopper frame.

*The stacker off-set devices*

When stacking the record cards, it is desirable to off-set the position of certain cards, such as master cards or heading cards, to distinguish them from other records such as item records, and thus make them readily available for removal should the operator decide to separate the two kinds of records. The off-set records are stacked to project beyond the filed position assumed by the ordinary cards during stacking operations.

It is noted that rods 563 are rocked slightly to engage the advancing records with the parts on the stacker drum to advance them toward the stacking position. These rods 563 are also given motion of translation, i. e., they are shifted across and through the bearing supports in the stacker drum to carry the card held thereon to a secondary position, and in this way the record is readied for stacking in the off-set position.

The control over off-set stacking is exercised by a magnet SO (Figs. 2 and 8) which is energized to denote the engagement of a special card on the stacker drum and to cause the shifting of the particular rod 563 holding the card clamping devices at that particular position, and thus cause off-set stacking of the record. It will be realized that the detection of such a special card by sensing an X perforation or other distinguishing perforation happens at a time quite a bit earlier than the time during which the card is advancing from the stacker engaging position to the stacker card discharging position. For this reason the detection device involves relay delay controls that are pointed out more fully hereinafter, with reference to the wiring diagram.

Returning to the mechanical aspects of the off-set stacking control, it will be noted that the control magnet SO is mounted on a horizontal plate 582 which fastens it alongside of and just inside the left stacker side frame 59. Pivoted at 583 and overlying the magnet SO is an armature lever 584 which is normally in a raised position and projecting in the path of the vertical arm 585 of a bail 586 pivoted on a stud 587 extending inwardly from frame 59. A spring 588 tends to rock bail 586 in a clockwise direction to swing the lower end thereof past the end of the armature lever 584, but is prevented thereby as long as the magnet SO remains deenergized. When the magnet is energized, the armature lever 584 is rocked clockwise downwardly and then the bail arm 585 is free to rock clockwise as urged by spring 588.

The horizontal arm of bail 586 carries a wedge-shaped cam 590 which, when lowered, is placed in the path of a roller 591 fastened to the left end of the rod 563 which, at the time, is moved in the upper arc carrying a card from the engaging to the stacking position. The cam 590, when thus conditioned by energization of magnet SO, serves to push the rod 563 towards the right carrying the arms 570 thereon and all four card engaging clips towards the right to shift the card to the off-set stacking position.

Although the cam surface of cam 590 is not of a long duration, the shifted position of the rod is maintained by a ball and socket arrangement cooperating with rod 563. In the sectional view (Fig. 9), it is seen that the rod is shaped with a pair of grooves 592, marking the normal and off-set positions, said grooves cooperating with ball 593 seated in an opening containing a pressure spring 594 in the wall of the end section 560 of the stacker drum.

Since the cards are carried at intervals of 180° on the stacker drum, the off-set shifting of cam 590 must be reset rapidly in order for the parts to be reconditioned to either permit normal stacking or provide off-set stacking for a card following directly on the heels of the card which has been shifted to the off-set position. For this reason there is a restoring plate 596 secured to shaft 63 inside the left side frame. This circular plate 596 carries a pair of operating screws 597 adjustably secured to and extended from the left side of plate 596 at intervals of 180°. The screws 597 rotate in a path which is normally missed by the lower end of a depending cam formation 598 extending from the horizontal arm of bail 586. However, when the off-set cam 590 is lowered by the bail into the operating position, the restoring formation 598 is also lowered into the path of one of the two operating screws 597 and is engaged thereby after the off-set positioning of rod 563 has been performed and restoration is effected by the lifting action of the screw to rock bail 586 in a counterclockwise direction, wherein the lower end thereof is brought again into abutting relation with the end of the armature lever.

Another restoration action is required, that is, the movement of the off-set rod 563 back to the position wherein ball 593 engages the right hand groove 592. Whenever one of the rods 563 is cammed to the right into the off-set stacking position, a roller 599 on the right end of the rod is moved over into position to engage a slanted arcuate cam formation 600 which is attached to the right side frame 26 and projecting inwardly therefrom in the path of one of the two rollers 599 as they swing around from the stacking position back to the card engaging position. By means of this camming action, rods 563 are always put in the normal position just before engaging a card and carrying it around towards the stacker.

*Stacker controls*

In addition to the key 84 (Fig. 6), already described as provided to operate a latch 78 to allow release of the stacker frame, another key 603 (Fig. 2) is provided to control the card stacker end weight 71.

When the capacity has been reached of over 9 inches of stacked cards on plate 73, the end pressure weight 71 reaches a position wherein a hook 604 thereon engages a tooth 605 on a key lever 606 pivoted at 607. Directly thereafter, the weight operates a switch to stop the machine.

After the stacked cards are removed, the weight remains latched at the end, because a spring 608 tends to hold the lever 606 in the latching position. Depression of key 603 serves to rock lever 606 to release hook 604 and weight 71.

In furtherance of the explanation regarding accumulation, reference is now made to the mechanical view (Figs. 16 and 17) to point out the essential mechanical parts used in the accumulating action.

*The accumulator*

In Fig. 16, the driving shaft 713 is suitably geared to the card feed rollers so as to make one revolution for each cycle of operation. For each denominational order of the accumulator, this shaft 713 has a gear 714 secured thereto which drives the adding clutch mechanism. The clutch driving mechanism is of the same construction as shown in Lake et al. Patent 2,328,653 and includes a ratchet 715 which is free on post 716 and integral with a gear 717 driven by gear 714 (Fig. 17). Rotatably carried by post 716 is a disk 720 having ten teeth **720*a* adapted to be engaged by a tooth 721*a* on the long arm of a clutch lever 721** to hold the disk against rotation in a counterclockwise direction.

At the side of disk 720 is a register or adding wheel 724 rotatable on post 716 and provided with ten peripheral notches **724*a*. Wheel 724 may take any of ten rotative positions with the values 0, 1 . . . 9. A spring-pressed lever 725 engages with a notch 724*a* of wheel 724 to hold the wheel impositively and to center it in the value position into which it has been rotated. A transfer cam 726 is fixed to the side of wheel 724 and a stud 727 in wheel 724 extends through an opening in disk 720 to pivotally carry a clutch dog 730. A spring 731 urges the tooth of dog 730 to engage ratchet 715. In the positions shown in Fig. 16, the clutch lever 721 is in declutching position, its tooth 721 is restraining rotation of disk 720 counterclockwise and dog 730 is clear of ratchet 715. The dog 730 is being held clear of the ratchet by coaction of a pin 730*b* on the dog with a cam edge 720*b* of disk 720**.

When the clutch lever 721 is dropped to cause its tooth **721*a* to release the disk 720 for counterclockwise movement, the spring 731 is effective to rock the dog 730 into engagement with ratchet 715. During this movement of the dog 730, its pin 730*b* rides along the cam edge 720*b* and cams the disk counterclockwise until its tooth 720*a* previously engaged by tooth 721*a* is to the right of the latter tooth. The parts are then in the clutching position shown in Fig. 17, and the register wheel 724 is coupled to the driving device 715, 717 for rotation. Through engagement of the pin 730*b* of the dog 730 with cam edge 720*b*, the disk 720** is forced to rotate counterclockwise together with the register wheel.

When the clutch lever 721 is returned to upper declutching position, its tooth **721*a* intercepts a tooth 720*a* of disk 720 and stops the disk. Register wheel 724 and dog 730 continue rotating while cam edge 720*b* of disk 720 cams the pin 730*b* outwardly until it is again in its outer position. As the pin 730*b* is cammed outwardly, clutch dog 730 moves clear of ratchet 715 and declutches the register wheel from the driving means. The register wheel is then held and centered in its new value position by lever 725. A spring-urged latch 735 serves to hold lever 721** in either clutching or declutching position.

The clutch lever 721 has a short arm swiveled to the lower end of an armature 736 which is disposed between an advance magnet AM and a stop magnet SM. Energization of magnet AM rocks armature 736 clockwise to lower lever 721, and energization of magnet SM rocks armature 736 counterclockwise to raise the lever 721.

When the wheel 724 is in its 0, 1 . . . 8 positions, the cam 726 holds a carry lever 737 pivoted at 738 in the position shown in Fig. 16, where a contact blade 739 (insulated from lever 737) takes a midposition between contact elements 740 and 741. When the wheel is in its 9 position, a tooth on lever 737 is dropped into a cut **726*a* of cam 726 and blade 739 contacts element 741. When the wheel 724 passes from the 9 to 0 position, a rise 726*b* rocks lever 737 to cause blade 739 to engage element 740. When the lever is so rocked, an arm 742 integral therewith is engaged and held by a spring-urged latch 743 which maintains the contact engagement between 739 and 740 until a pin 744 in gear 714 strikes an arm 745 integral with the latch 743 to release lever 742**. The point in the cycle at which such unlatching occurs is indicated in the time chart in Fig. 18. The accumulator is also provided with a mechanical knock-off or declutching mechanism which comprises three pins 751, 752 and 753 secured to the side of gear 714 and adapted during rotation of gear 714 to ride in succession under an edge of clutch lever 721.

Assume the clutch lever to be in lower position, when either pin 751, 752 or 753 engages lever 721, it cams it upwardly into the position of Fig. 16. The knock-off pins 751, 752 and 753 are effective at fixed points of the cycle as indicated in the diagram (Fig. 18).

*The wiring diagram*

The electrical controls of Fig. 19 are a composite showing of the controls operated directly by the card sensing unit and the other controls of a cooperating machine, such as an alphabetic tabulator associated therewith. Since the card feed and sensing devices are driven by the tabulator, the start and stop controls thereof, as well as the adding and printing controls, are of interest in connection with the sensing unit.

Between two main lines 615 and 616, there are power supply means and a main switch.

After the main switch has been closed, the depression of a start key and closure of its contacts 617 serves to energize the pickup coil of a start relay R12 as follows: line 615, cam contacts CR6, wire 618, key contacts 617, coil R12, wire 619 and line 616. Relay R12 establishes a holding circuit for itself through cam contacts CR5, wire 620, related contacts R12*a*, holding coil R12, wire 619 and line 616.

Other contacts R12*b* of start relay R12 are closed to prepare an automatic start circuit through relays R13 and R14 to be independent of the start key and dependent on the presence of cards in the magazine and positioning of the stacker file end weight. The initiating circuit for relay R13 includes line 614, wire 623, stop key contacts 624, wire 625, stacker switch contacts 87 closed as long as the stacker is unfilled, wire 626, contacts R12*b*, relay R13, wire 619 and line 616.

Relay R13 closes contacts R13*a* in series with the pickup coil of the automatic start relay R14. The circuit includes line 614, wire 615, cam contacts CR3, wire 628, contacts R13*a*, pickup coil R14, wire 619 and line 616. Relay R14 then closes contacts R14*a* to set up a holding circuit through the start relay. The holding circuit comprises line 614, wire 615, cam contacts CR2, wire 629, contacts R14*a*, the holding coil R14, wire 619 and line 616.

Associated with relay R14 are other contacts R14*b* for closing in series with all clutch control magnets including the front gate control which is the card feed and picker operating magnet FG. Operation of this last mentioned clutch magnet serves to initiate card feeding by means of the circuit from line 614 through wire 630, relay contacts R14*b*, wire 631, cam contacts CR125, wires 632, 633 and 634, clutch magnet FG, wires 635 and 636 to line 616. Operation of the picker serves to advance the first card into the first sensing station U, and in so doing it operates the card lever 298 to close contacts 303 and operate a relay R4 to effect many of the sustaining controls associated with the card sensing unit.

Other of the sustaining conditions are based upon the presence of the record cards in the magazine as evidenced by the closure of the hopper contacts 296 and the energization of a hopper control relay R1. The circuits for the hopper relay include the one passing from line 614 through wire 639, contacts 296, relay R1, wire 619 and line 616. Relay R1 then closes associated contacts R1*a* to establish a holding circuit including line 614, wire 639, cam contacts P3, relay contacts R1*a*, relay R1, wire 619 and line 616.

The circuit for the primary card lever relay R4 includes the one first established by closure of contacts 303 in series with the pickup coil. This circuit involves line 614, wire 639, cam contacts P2, card lever contacts 303, the pickup coil of relay R4, wire 619 to line 616. A holding circuit is established for the holding coil of relay R4 by the closure of associated contacts R4*a* in a circuit involving line 614, wire 639, cam contacts P1, relay contacts R4*a*, the holding coil of relay R4, wire 619 and line 616.

In addition to the indication that a card is passing into the first sensing station, it is required that a later indication be given to sustain the control exercised by the same card as it passes the second sensing station. This function is performed by relay R7 which is picked up through the R4 holding circuit and sustained for an additional cycle. The pickup circuit for relay R7 includes line 614, wire 639, cam contacts P1, relay contacts R4*a*, cam contacts CF3, the pickup coil of relay R7, wire 619 and line 616. The holding circuit for relay R7 is established by closure of related contacts R7*a* and the additional closure of cam operated contacts 581 closed near the end of the cycle whenever the stacker is in operation. This closure is effected by the cam described hereinbefore. The circuit sustaining relay R7 includes line 614, wire 639, wire 640, contacts 581, relay contacts R7*a*, the holding coil relay R7, wire 619 and line 616.

Now that it has been pointed out how the relays R1, R4 and R7 are energized, depending on the presence and advancement of record cards, further illustration of the controls over starting and sustaining the record feed may be explained.

In connection with the maintenance of energization of start relay R13, it will be noted that the relay is made independent of start key depression after the first cycles for advancing the record. This is done by means of a set of contacts R1*b*, R4*b* and R7*b*, all arranged in series with each other and with relay R13 to sustain it as long as cards are present. The complete feeding control circuit includes line 614, wire 623, stop key contacts 624, wire 625, stacker stop switch contacts 87, wire 626, relay contacts R1*b*, R4*b* and R7*b*, relay contacts R13*b*, relay R13, wire 619 and line 616. By means of the sustained energization of relay R13, it is possible also that relay R14 be maintained through the closure of contacts R13*a*, and the condition is maintained by the presence of the records in the magazine and their advancement through the sensing unit.

It is already noted that the clutch magnet FG for the first card feed control gate and the picker mechanism is operated through cam contacts CR125 and the automatic start control contacts R14*b*. Along with such energization there is an early operation of the first pin holder, shifting clutch control magnet FP which serves to lower the pins into cooperation with the record at the first sensing station U. The circuit through clutch magnet FP is dependent upon the closure of relay contacts R4*c* which, it will be remembered, become effective by action of the card lever 298 showing that a card is entering the first station.

Also dependent upon the action of the relay R4 is the energization of the card feed cam contact control magnet CF to connect a shaft of cams to the main drive. For this purpose a relay contact R4*d* is in series with clutch magnet CF. The remainder of the circuit comprises line 614, wire 630, start control contacts R14*d*, wire 631, cam contacts CR126, relay contacts R4*d*, feed control magnet CF and wire 641 to line 616. The foregoing circuit refers to the magnet CF which is used to clutch a normally idle cam contact carrying shaft for driving connection with the sensing unit. The contacts established by movement of the shaft associated with the CF clutch magnet are differentiated from the constantly running cam contacts CR, since the latter have a direct connection with the driving mechanism.

The record is released from the second sensing station by the action of the rear gate clutch magnet RG which is under the joint influence of the hopper contact relay R1 and the card lever relay R4. Normally, the circuit for the rear gate operation is controlled by contacts R4*e* and the remainder of the circuit is as follows: from line 614, through wire 630, start contacts R14*b*, wire 631, cam contacts CR125, wire 632, relay contacts R4*e*, wire 642, clutch magnet RG and wires 635 and 636 to line 616. When the last card of a stack is to be passed out of the second sensing station, there is lack of control by relay R4 and then the circuit is directed through a pair of normally closed hopper control relay contacts R1*c*. These contacts are arranged in shunt around relay contacts R4*e* and take over the circuit connections normally directed thereto and serve to hold the clutch magnet RG energized for the last card feeding cycle, after which the start control contacts R14*b* open to terminate clutch operations.

Along with the control of the record after it passes into the second sensing station, it is desired to energize the pin holder clutch magnet RP relating to the pin sensing devices in the rear station L. Energization of this magnet RP is dependent upon joint operation of the card lever relays R4 and R7 showing that a card has left the first sensing station and is present at the second sensing station, then a complete circuit is established therefor as follows: line 614, wire 630, start contacts R14*b*, wire 631, cam contacts CR125, wire 632, relay contacts R4*e*, relay contacts R7*c*, clutch magnet RP and wires 635 and 636 to line 616.

The off-set stacking control magnet OS is operated under control of a control relay OSC and selector relays R115 and R116 made effective as the card is analyzed and found in a certain column to have a perforation while at the second sensing station. The pluggable connection includes a socket 643 connected to the socket 644 of a selector pickup and transfer control in series with an X cam contact closed at the timing and in series with the relay R116 connected to the line 616. The contacts of the last mentioned relay are of the class selector type and in series with the relay OSC to control the off-set stacking magnet OS.

The preliminary pickup circuit for off-set stacking follows a path through the sensing unit and relay R115 as follows: line 614 and wire 615, wire 652, circuit breakers CF34 and CF35, wires 653 and 654, frame 395, contact crank 400 in the selected order, strip 409, socket 643 and plug wire to socket 644, X cam contacts, pickup coil of relay R115 and wire 671 to line 616. Relay R115 then closes contacts R115*b* in series with relay R116 and the second relay is picked up near the end of the cycle by the closure of relay contacts R40*a* and the circuit includes line 614, wire 615, cam contacts CR32, wire 672, relay contacts R115*b* and R40*a*, relay R116 and wire 671 to line 616. Relay R116 is then held through cam contacts CR30 and operates to close contacts 673 of a class selector and energize the off-set stacker control relay OSC as follows: line 614, wire 615, cam contacts CR59, socket 674 plugged to socket 675, contacts 673, common socket 676 plugged to socket 677, relay OSC and wire 678 to line 616. Relay OSC has a holding coil which is set up through contacts CF37 and also operative of contacts OSC*b* in series with the off-set magnet OS. Magnet OS is energized at the proper time by a circuit comprising line 614, wire 615, cam contacts CF36, wire 680, magnet OS, wire 678 and line 616. The mechanical action of the magnet is described hereinbefore.

In addition to the control circuits mentioned hereinbefore, the sensing unit contains the six sets of card analyzing contact devices separated in the sections devoted to sensing stations U and L with three decks at each of said stations, each deck comprising sixty separate sensing and impulse creating devices under control of one column of card code positions at seven index points. As already noted, each sensing device comprises a rocking contact establishing crank 400 mounted in the main swinging frame 395 and adapted to engage a contact strip 409 at differential timing, depending on the positions of the seven card sensing pins related thereto. These parts are shown diagrammatically in the wiring diagram (Figs. 19, 19*a*, and 19*b*), so that the sensing devices of the separate columns and decks and separate sensing stations may be identified.

Since the group control function is one wherein the sensing devices of both stations U and L are involved, it is of interest to the performance of sensing that a sample circuit of this kind be traced. The circuit involves pairs of control relays C1 and C2 and pairs of related and connected contacts C1*b* and C2*b*, one of which is made effective upon lack of coincidence between perforations at both sensing stations relating to the same kind of data. For example, when the record cards are arranged according to group number, these numbers are represented in code in a certain field and deck of each card, and a grouping of related cards will have the same data. Upon changes in groups, i. e., when the last card of one group is at station L, while the first card of the incoming group is at station U, then there is a lack of coincidence and there will be a failure to energize one of the group control magnets at the same time that the other is energized, the circuit for which is about to be pointed out. The group control circuit includes line 614, wire 652, circuit breaking contacts CF34 and CF35, wires 653 and 654, the main sensing frame 395, common to all contact cranks in the sensing unit, then through the particular sensing crank 400 concerned with the group number card field, the corresponding contact strip 409 and plug socket 681 connected thereto, a plug wire to socket 682 of the group control magnet C1 and then a wire 657 to the other side of the line 616.

The companion magnet C2 of the group control devices is provided with a plug socket 684 which is connected by a plug wire to a socket 683 connected to a sensing strip 409, and contact lever 400 in a position in the first sensing station U related to the position occupied by the sensing device for a plug socket 681, as already mentioned. As long as there is coincidence of perforations at the two stations indicating similarity of card group number perforations, there will be a maintenance of the running circuits of the tabulator showing no change in group. However, upon a change either one of the control magnets C1 or C2 will be energized in the absence of the other and cause shift in the contacts C1*b* and C2*b* in series with minor control magnet MI. Assuming that contacts C1*b* are closed alone, then the circuit involves line 614, wire 615, wire 687, right contacts C1*b* now closed, right contacts C2*b* normally closed, plug connections from socket 685 to 686, magnet MI and line 616. The resulting action of group control magnets MI to cause total taking cycles in tabulators are well known in the art.

As an example of the further use of the impulses initiated by the sensing devices, it will be pointed out how accumulation and alphabet printing are controlled from the station L, which is the one equipped with double contact levers 400 associated with each set of sensing pins in order to read out not only the sensing positions directly but also to interpret the higher digits with "late 5" conditions, such as in the addition of 9.

As an aid to the understanding of the process of addition, reference may be made to the central portion of the timing chart, where a diagrammatic showing is given of the three positions occupied by the double sensing cranks in the emission of impulses to send the 3, 0 and late 5 impulses into the accumulating controls. The mechanical nature of the accumulating controls is shown in Figs. 16 and 17 described hereinbefore and more fully in the patent application, Serial No. 703,752, filed on October 17, 1946, now Pat. No. 2,500,269. It is sufficient to note here that, when a plug connection is established from a socket, such as socket 661 associated with a sensing device in deck B of the sensing station L and a plug wire is connected therefrom to the accumulator plug socket 662, then an adding control circuit is directed through the adding control magnet AM as follows: from line 614, through wire 652, circuit breaker contacts CF34, CF35, wires 653 and 654, frame 395, contact lever 400, contact strip 409, plug socket 661, a plug wire to socket 662, wire 663, adding control magnet AM, wire 664 and line 616.

The value determined by the entry of the impulse is gauged by the time at which it is initiated and also by arrangement of the electrical and mechanical knock-off points revealed in the showing of the accumulating structure and also shown at the bottom of the timing chart. There it is seen that for the addition of a small digit, such as 1 to 4, the impulse is initiated either before or along with the timing of the electrical knock-off. This electrical knock-off is a function created by the closure of a cam contact AC2 at the "0" time, said contact being in series with the subtraction magnets SM of the accumulator. If the accumulator is not moving at the time, i. e., the adding magnet AM is not energized, then the momentary energization of the subtraction magnet SM serves to neutralize any sensed zero perforation, as in the case of perforations representing 0 and 5.

However, should the accumulator be moving at the time, due to the sensing of a 0 digit perforation as well as a 0 hole, then the electrical knock-off and the energization of the subtraction magnet SM are ineffective and a unit is added, due to the presence of a 0 perforation, because at the time the common armature between the adding and subtracting magnets is disposed at a point remote from the influence of the subtraction magnet SM and affected in a greater measure by the energization of the adding magnet AM. For example, in the case of adding the digit 1, the timing is such that the moving bell crank establishes contact at the "1" position early enough to engage the accumulating devices for one step of movement, and then be deenergized at a time when the electrical knock-off impulse is directed through the subtraction magnet to terminate addition.

However, for the addition of the digit 2 then the contact crank is rocked twice at the 1 and 0 positions to send separate impulses, the first starting of the accumulator movement and the second sustaining movement despite the effort of the electrical knock-off to disengage the adding connection. However, the connection is maintained until the first mechanical knock-off to the position indicated by the position 751 on the timing chart.

For the addition of digit 3, there is a single sensing device impulse at the position indicated "3" on the circuit breaker timing and this control is terminated by operation of the electrical knock-off because there is lack of any counteraction to the effect of the subtraction magnet. The addition of the digit 4 is caused by two impulses at the 3 and 0 positions, and here the attempt of the electrical knock-off to prevent addition of the final unit is overcome and termination is caused by the first mechanical knock-off 751.

For the addition of the digit 5, there is a failure to convey the first detection of a 5 impulse because the circuit breakers for addition columns do not close at the "early 5" position, and thus are distinguished from the regular circuit breakers working in all code positions to send impulses for printing, group control digit selection, etc., kinds of control. The 0 perforation accompanying the 5 perforation to represent 5 is provided to give symmetry for other code contact arrangements and serves no purpose of present concern, and is merely neutralized by the electrical knock-off impulse and nothing is added until the "late 5" impulse starts the accumulator movement.

Addition of the digit 6 is accomplished by the separate additions of a unit as indicated by a perforation in the 1 position followed by a late 5, as determined by the perforation in the 5 position. The timing is such that the impulse at the "1" time is followed by the electrical knock-off after which the accumulator is idle, until the second sensing crank sends the second or "late 5" impulse, at which time the accumulator is re-engaged and held to accumulate five additional units before being stopped by the second mechanical knock-off point indicated at 752 on the timing chart.

The addition of the digit 7 differs due to the presence of the extra 0 perforation in the code, said perforation serving to overcome the electrical knock-off point and thereby cause the addition of two units, i. e., from the 1 position to the mechanical knock-off time at 751 before the additional movement of the accumulator by the late 5 detection.

Eight is added by an initial entry of 3 followed by the late 5 steps.

The addition of the digit 9 is further illustrated by the positional views wherein the first or "early 5" sensing position is that used for control of the printing mechanism and group comparing circuits rather than for adding control. The second diagrammatical view shows the analysis of the 3 position. This is followed by the third crank position at "0," and this is the impulse emitting point which serves to overcome the electrical knock-off if adding parts are in movement. The fourth positional view shows the parts at the time and in the condition wherein the second crank 400 is operated as controlled by the depressed 5 pin to send the "late 5" impulse which serves to re-engage the accumulator, and it is so held until the mechanical knock-off point 752.

If a carry impulse is to be effective it is timed to come in that interval after the second mechanical knock-off point 752 and before the third or final knock-off point 753.

*The timing chart*

At the top of the chart in Figs. 18 and 18*a* it is seen that the complete cycle is divided into 24 points for reference to different portions of control. These 24 points are established definitely in an electrical way by the use of mastic circuit breaker cam contacts at the power source. With the 360° of a cycle divided into 24 equal parts of 15° each, a portion of 8° duration is assigned to each cycle point starting with the first at 7°.

Beneath the main circuit breaker timing is shown the mode of operation of the pin retractor cam 154 which allows the sensing pins to be lowered for about 200° at the start of each cycle and then retracts them at the end of the cycle to permit card feeding. Of course, the cards remain stationary during the time that the pins are lowered and sensed.

The third showing is that of cams 162 and 163 which are used to shift the carrier for the pin sensing cranks or levers. It is evident that the cam operates with what is substantially uniform movement with short minute dwells to first wipe the cranks over the pin heads for over 200° and then restore them to the home position at a slightly faster rate.

The sensing unit contact time represents the actual establishing point and contact duration made by the sensing contact crank for each of the seven possible perforations of the code. The contact duration at the X position is extended because, if an X perforation is sensed, the contact will not open until interrupted by a "5" pin which is held up due to the absence of a "5" perforation. Therefore, the extended X time exists not only due to the sensing of the X hole but also represents the crank movement through the space between the X pin of one deck and the 5 pin of the next upper deck.

Cam contacts CF34 and CF35 provide the circuit breaker contact timing for the eight possible code readout positions (including the "late 5" reading by the second crank). These contacts shorten and define the rough mechanical code impulse timing of the contact crank levers.

The carry cam contact CC3 is an outside tabulator cam related to the accumulator set forth in other patents and applications noted hereinbefore.

The four positional views of the pins and double sensing cranks illustrate the contact timing for the entry of "9." The first view relates to the sensing of the "early 5" which is ineffective as far as adding is concerned by being eliminated by tabulator list control cam contacts TL closed only at a time beginning from 16° to 22° in series with the adding magnet AM. However, the "early 5" impulse is useful for group number comparing control, digit selection control, and printing control. As a matter of illustration, deck B is chosen as representative of the three decks, and the pins, cranks and contact strips relating thereto are shown. The "5" pin at the sensing time is lined up vertically with the "5" impulse time to show the position of the parts at that particular time.

The digit 3 is entered directly into the accumulator by the impulse initiated at 22° as shown.

When the "0" perforation is sensed at 67°, it is used to overcome the action of the electrical knock-off because the accumulator start or adding magnet AM has been energized under control of the "3" impulse as is the case in the addition of 4, which is represented by the code combination 3–0.

If the accumulator starts adding rotation under control of either a 3 or 1 perforation in the absence of a 0 perforation (as would be the case for adding digits 1, 3, 6 or 8), the electrical knock-off impulse is effective to operate the stop magnet SM and disengage the accumulator at 67°.

However, if the accumulator wheel starts rotating under control of either a 3 or 1 code impulse and is also associated with a "0" perforation in the card (as would be the case for adding 2, 4, 7 or 9), the action of the electrical knock-off having been nullified, the accumulator is permitted to advance one step beyond the electrical knock-off time, at which point the first accumulator mechanical knock-off pin 751 is effective for disengagement to prevent further addition.

Regarding the fourth or last illustrated position of the sensing parts at 202°, wherein the second crank establishes contact for a "late 5" impulse, this control is entered directly into the start magnet AM to begin adding five units. The accumulator is then stopped by the second mechanical knock-off pin 752 at about 275°.

By means of the illustrated positions, it is brought out that some of the sensing cranks serve a double purpose in connection with the pins of two decks. It will be noted at deck B that, while the second row of cranks are used to sense the "early 5" thereof, the third row of cranks were used for sensing the "early 5" of deck A. Then later, that same third row of cranks is used for sensing the "late 5" of deck B.

Regarding the accumulator clutch timing, there is an allotment of 15° machine cycle time for each clutch tooth movement. The relation of the clutch teeth to the control impulses represents a 2° overlap as shown.

After carrying is effected in the accumulator as provided by the tabulator cam contact CC3 at about 290°, the third mechanical knock-off pin 753 is effective at about 305° to disengage the adding wheel.

Although most of the foregoing timing controls are explained with reference to the code digit positions 5, 3, 1 and 0, it will be realized that the impulses from the Z, Y and X positions are also useful directly as comparing controls and indirectly as zoning controls for purposes such as alphabet printing.

On the second part of the chart (Fig. 18*a*), the timing of the regular cam contacts CR, CF, PC and stacker contacts 118' are shown. These are related to constantly running or sensing control, card feed or sensing operation control, the picker control and filing or stacker controlled cams, respectively, as noted hereinbefore.

The stacker cam contacts 118' hold the circuits through the second card lever control relay R7 until the last card is on the stacker drum. The cam 118 is on the clutch spool shaft 117 of the rear gate controls and is operated as often as cards are presented at station L. The contacts open at 240° on the last feed and stacking cycle to break down the relays in readiness for renewed starting control with relation to a new set of cards placed in the magazine.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a sensing device for reading a record perforated to represent data, a set of sensing pins relating to one order cooperating with a column of perforation positions of the record, means for raising and lowering the pins with respect to the record, a lever cooperating with one end of the set of pins, means for moving said lever over the set of pins to be adjusted differently as it passes over pins lowered thru perforations in the record, and electrical contact devices cooperating with said lever to emit timed impulses representative of the value of sensed data perforated caused by adjustment of the lever as it cooperates successively with raised and lowered pins.

2. The combination set forth in claim 1 wherein each pin is formed with a blunt end of reduced cross section to rest on the record in a perforation position and a rounded head over which the lever rides.

3. The combination set forth in claim 1 wherein the lever is shaped as a bell crank with one end formed with a cam face to ride over the pins and the other end is twisted to present a flat area in which is mounted a contact point with an arcuate face to cooperate with straight surface on said contact device.

4. The combination set forth in claim 1 wherein said contact devices include a flat L shaped contact strip attached to a flat insulation bar whereby it is insulated from other strips, the lower edge of said strip extending below said bar and having a straight underside for contact with said adjustable lever, the upper part of strip being crimped to be receptive of flexible terminals for wires.

5. The combination set forth in claim 1 wherein a comb bar is provided to hold said lever loosely in a groove between comb teeth, a rod seated in opening thru said teeth, said lever being pivoted on said rod, a spring seated in said bar and pressing on said lever to urge it into cooperation with the pins, a comb plate fastened to said bar and formed with teeth to guide the end of said lever adjusted by said pins, and a stop formation on said bar for limiting the adjustment of said lever to hold said spring confined.

6. The combination set forth in claim 1 with a second lever cooperating with said set of pins and said contact devices, said second lever being moved over an end one of said pins later than the first lever, said second lever also cooperating with said contact devices to emit a later impulse.

7. The combination set forth in claim 1 wherein there are seven data representing positions in a column and a column of seven pins cooperating therewith, a second lever cooperating with said set of pins and said contact devices, said second lever being moved by said moving means over an end one of said pins after the first mentioned lever has moved thereover, said second lever also cooperating with said contact devices to emit a later impulse, whereby combinations of eight differentially timed impulses are emitted.

8. An electrical sensing device for reading data represented in ordinal columns of perforated code on a record, a plurality of sets of headed sensing pins, one for each possible perforation position on the record and each set for an ordinal column, means for holding said pins poised over the record, means for lowering said holder to project certain of the pins down thru the perforations, a set of analyzing levers, each having a cam end and a contactor end, said levers each aligned with an ordinal column of pins and with said cam end adapted to move in a path obstructed by the heads of pins remaining in an unlowered position, means for urging said levers to swing with the cam end lowered when passing over the head of a lowered pin, means for holding said levers, means for sliding said lever holding means to move all levers horizontally with the cam ends passing over related pin heads in timed relation, and stationary contact plates each above a related lever and in the path of said contactor end which makes electrical contact therewith when a lever is rocked by passage over a lowered pin, whereby timed impulses are created representative of the data value of the perforations in code positions.

9. In a record sensing device for analyzing data indicia in a column on a record, sensing instrumentalities cooperating with said column of indicia including a pair of contact establishing members, means for mounting said members apart a distance greater than the length of said column, means for shifting said mounting means and the members relative to the other of said instrumentalities so that one of said members is affected by all indicia in the column and the other of said members is affected by fewer of the indicia in the column, and means under control of said members for emitting impulses.

10. The combination set forth in claim 9 wherein the indicia represent data in a seven place code, said one member being adapted to send successively impulses representative of any seven indicia, and said other member being adapted to send later an impulse representative of but one indicium.

11. The combination set forth in claim 9 wherein the indicia represent 5, 3, 1, 1 digitally, whereby the one member operates early to send impulses representative of 1, 2, 3, or 4 and the other member operates later to send an impulse representative of 5, and means under control of said impulses to accumulate the digit values.

12. In an accumulating device controlled by a record with digits represented in four position code with indicia identified as 5-3-1-0 progressively upward in a column, an adding wheel, a clutch therefor, a pair of magnets for controlling said clutch, one to engage and drive the wheel and the other to disengage the wheel, said wheel being operable in a cycle wherein the digits 4, 3, 2, or 1 are added early in the cycle and the digits 5 and larger receive an increment of 5 later in the cycle, two mechanical knockoff devices to disengage said clutch to terminate adding after said early and late entry portions, means for sensing the code indicia, means under control of the sensing means for initiating add control impulses in the order 5–3–1–0–5, said impulses being directed into the engaging magnet, means for eliminating the first 5 impulse, an electrical knockoff means for operating the disengaging magnet at the "0" index time to stop the adding wheel, said electrical knockoff being effective in the absence of a "0" indicium to terminate the movement of the wheel to enter the digits 1 or 3 and the first part of the digits 6 or 8; the values 2, 4, 7, and 9 involving the use of a "0" indicium to represent a unit in the code wherein positions 1 & 0=2, 3 & 0=4, 5 & 1 & 0=7, and 5 & 3 & 0=9, means under control of the "0" impulse for sustaining energization of the engaging magnet and overcoming and preventing the electrical knockoff means from operating the declutching magnet, whereby the wheel advances one more step before the early mechanical knockoff device terminates the addition of 2 or 4.

13. The combination set forth in claim 12 wherein means is provided whereby a carry impulse is conveyed to said engaging magnet from a lower order wheel passing through 9, and a third mechanical knockoff device for terminating movement of said wheel.

14. In a record sensing device for analyzing data indicia in a plurality of columnar positions on a record, data sensing instrumentalities cooperating with said column of positions to detect indicia therein and including a pair of contact establishing members, a movable holder whereon said members are mounted and spaced apart, means for shifting said holder and members relative to the other of said instrumentalities so that both members are affected by indicia in the column, and means under control of both members for emitting impulses, whereby a larger number of impulses can be emitted than the number of indicia positions in a column.

15. In a record sensing device for analyzing data representing perforations in a plurality of aligned columns in a record, each column representing a denominational or alphabetical order of datum, a plurality of sensing instrumentalities each including an ordinal set of sensing pins and a contact establishing member cooperating therewith, means for dropping predetermined pins of the sets in said perforations, means for adjusting said members relative to said pins to be operated by dropped pins differentially, and separate current conducting strips contacted by said members when operated, whereby a plurality of differentially timed impulses are emitted.

16. The combination set forth in claim 15 wherein each record bears three decks of data columns with sixty columns in a deck and seven data perforation positions in a column, said adjusting means moving all one hundred eighty members simultaneously, whereby combinations of seven differentially timed impulses are emitted simultaneously for all columns.

17. The combination set forth in claim 15 wherein each record bears three decks of data columns, said sensing instrumentalities having three decks of pin sets and four decks of contact members, said decks of contact members being spaced apart the same distance as the pin decks but moved by said adjusting means a greater distance than said spacing, whereby successive pairs of the four members in a column cooperate with one set of pins to emit a larger number of combinational timed impulses than the number of pins in a set.

18. In a record sensing device for analyzing a succession of records each bearing a column of data representing perforations, a succession of sensing stations at which there are sensing instrumentalities, said instrumentalities including a gate for stopping said record in position to be analyzed, a set of sensing pins, means for dropping certain of the pins in said perforations, contact establishing devices cooperating with said pins and adjusted thereby to emit impulses representative of dropped pins.

19. In a record sensing device for analyzing a succession of records each bearing a plurality of aligned columns of data representing perforations, a succession of sensing stations at each of which there are a plurality of sensing instrumentalities and a gate for stopping the record in position to be analyzed, means for feeding the records, means for operating said gates to stop the records, each of said sensing instrumentalities including a set of sensing pins for sensing the perforations of a column and a contact establishing member cooperating therewith to detect the pins which are in perforations, and means associated with said members for emitting impulses representative of data of a plurality of records.

20. The combination set forth in claim 19 with means for comparing the impulses emitted by any of the columns of one record with the impulses emitted by any of the columns of a succeeding record.

21. The combination set forth in claim 19 wherein there are three decks of data perforation columns on each record and three sets of pins for each column in each sensing station, whereby impulses representative of three lines of data are emitted simultaneously from a plurality of sensing stations.

22. In a record feeding device, feeding means including a pair of rollers underlying the side margins of the record, means for driving said rollers to advance the record, a gate against which the record is stopped, a side rail against which the record is to be aligned, a pair of upper rollers overlying said driving rollers and bearing on said record margins whereby the record is advanced frictionally, flexible means for urging said upper rollers against the lower rollers, and means for adjusting the angle of operation of said upper rollers whereby the record is advanced with one corner crowded into the intersection of said gate and said rail.

23. The combination set forth in claim 22 wherein said adjusting means includes a pivot bolt on which a roller turns, said bolt passing through an enlarged opening in the end of an arm, the two sides of said end being arcuate in shape and cooperating with similarly shaped washers through which said bolt passes, whereby said bolt and roller may be adjusted angularly on said arm and fastened there by tightening the arcuately placed washers in position by the bolt.

24. In a record feeding and sensing device, a magazine, a pair of sensing stations, means for advancing the records successively from the magazine to the first and then to the second sensing station, means for detecting the presence of records in said magazine including a hopper control relay, a card lever for detecting the passage of a record into the first sensing station, a first card lever relay associated with said lever, a second card lever relay, the energization of which is controlled by said first mentioned relay to continue one cycle after the energization of said first mentioned relay, card feed starting control devices, key for initiating operation of said starting devices, and means under control of said hopper relay, said first and second lever relays for sustaining operation of said starting controls as long as records are present.

25. In a machine for feeding and sensing perforated records, a magazine for holding the records, a pair of sensing stations, means for advancing the records successively out of the magazine and into the first and then into the second sensing station, separate gate mechanisms for stopping the records in a static reading position in the two stations, separate sensing pin holders poised over the records in the different sensing stations, a main operating mechanism, a set of four clutches, said set including a pair of clutches for operating said gate mechanisms and a second pair of clutches for operating said pin holding device, and controlling devices for causing said clutches associated with the first and second sensing station to be operated successively.

26. The combination set forth in claim 25 wherein a picker mechanism is provided to advance the records successively out of the magazine and into the first sensing station, a cam, a set of circuit breaking devices, a gear for operating said devices, said cam and gear being associated with the clutch devices associated with the clutch mechanism provided for the gate located in the first sensing station.

27. The combination set forth in claim 25 wherein a stacker mechanism is provided to arrange the records in a file after they leave the second sensing station, a train of gearing for operation of said stacker mechanism, the operating gear of said train being controlled by the clutch devices associated with the gate mechanism for the second sensing station.

28. In a cyclically operable accumulating mechanism of the type wherein the digit entry in an accumulator element is initiated by an impulse transmitted to a start magnet and is terminated by an impulse transmitted to a stop magnet, and wherein concurrent impulses to both start and stop magnets will render both ineffective, the combination of cyclic means for invariably transmitting an impulse to the stop magnet at a predetermined point, other means for mechanically stopping said element at two points the first of which is a unitary cyclic amount later than said said predetermined point and the second of which is effective later, and record controlled means for selectively transmitting a combination of four impulses to the start magnet at intervals with respect to the predetermined point and the second mechanical stop to add the units 1–9, a first impulse being effective three parts of the cycle before the predetermined point, the second impulse being effective one part of the cycle before the predetermined point, the third impulse being effective at the predetermined point to cause negation of the effect of the stop impulse and continuance of addition for one cycle part under control of the first mechanical stopping means, and the fourth being effective five cycle parts before the stopping control of the second mechanical stopping means.

29. In a record sensing device for analyzing code indicia arranged in a column on a record, said indicia comprising a plurality of groups of different code representations, means for successively analyzing the indicia of the different groups including a cam with a dwell for each interval between groups of indicia to extend the timing of analyzation thereof beyond the spacing of the groups, and means under control of said analyzing means for emitting control impulses.

30. The combination set forth in claim 29 wherein two groups of code representations are designated 5, 3, 1, 0 and Z, Y, X, said seven representations being evenly spaced as indicia, but said analyzing means cooperating therewith so that a cam dwell coincides with the interval between the numerically and alphabetically designated groups of representations, whereby the control impulses therefrom are read out with longer interval between the two groups than the interval between impulses of indicia within the groups.

31. The combination set forth in claim 29 wherein the four groups of indicia are designated 5, 3 and 1, 0 and Z and Y, X, said seven representations being evenly spaced as indicia, but said analyzing means cooperating therewith so that three of said cam dwells cooperate with the intervals between 3 and 1, 0 and Z and Z and Y, whereby the control impulses therefrom are read out with longer intervals between the four groups than the intervals between impulse representations of indicia within the groups.

HORACE S. BEATTIE.
RALPH E. PAGE.

REFERENCES CITED

The following references are of record in the file of this patent:

UNITED STATES PATENTS

| Number | Name | Date |
|---|---|---|
| 2,113,634 | Tauschek | Apr. 12, 1938 |
| 2,134,815 | Elliott | Nov. 1, 1938 |
| 2,172,758 | Rice et al. | Sept. 12, 1939 |